(12) United States Patent
Wu et al.

(10) Patent No.: US 12,543,225 B2
(45) Date of Patent: Feb. 3, 2026

(54) METHOD AND APPARATUS FOR WIRELESS COMMUNICATION

(71) Applicant: Lenovo (Beijing) Limited, Beijing (CN)

(72) Inventors: Lianhai Wu, Beijing (CN); Mingzeng Dai, Shanghai (CN); Congchi Zhang, Shanghai (CN); Haiming Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 357 days.

(21) Appl. No.: 18/249,821

(22) PCT Filed: Oct. 21, 2020

(86) PCT No.: PCT/CN2020/122392
§ 371 (c)(1),
(2) Date: Apr. 20, 2023

(87) PCT Pub. No.: WO2022/082484
PCT Pub. Date: Apr. 28, 2022

(65) Prior Publication Data
US 2023/0413351 A1    Dec. 21, 2023

(51) Int. Cl.
*H04W 76/10* (2018.01)
*H04W 8/00* (2009.01)
(Continued)

(52) U.S. Cl.
CPC .......... *H04W 76/10* (2018.02); *H04W 8/005* (2013.01); *H04W 76/20* (2018.02); *H04W 92/18* (2013.01)

(58) Field of Classification Search
CPC ..... H04W 76/10; H04W 76/14; H04W 76/20; H04W 76/23; H04W 88/04; H04W 92/18
See application file for complete search history.

(56) References Cited

U.S. PATENT DOCUMENTS 11,310,648 B2 *   4/2022   Agiwal ................ H04W 8/005
2019/0394816 A1  12/2019   Kim
(Continued)

FOREIGN PATENT DOCUMENTS

CN         109246793 A      1/2019

OTHER PUBLICATIONS

D. Garcia-Roger et al., "V2X Support in 3GPP Specifications: From 4G to 5G and Beyond," in IEEE Access, vol. 8, pp. 190946-190963 (18 pgs), 2020, doi: 10.1109/ACCESS.2020.3028621. (Year: 2020).*

(Continued)

*Primary Examiner* — Jason D Cardone
(74) *Attorney, Agent, or Firm* — FIG.1 Patents

(57) ABSTRACT

Embodiments of the present disclosure relate to methods and apparatuses for wireless communication. According to some embodiments of the disclosure, a method may include: establishing a RRC connection between a first UE and a BS via a second UE, wherein a PC5 RRC connection between the first UE and the second UE has been established and an RRC connection between the second UE and the BS has been established; receiving, from either the first UE or the BS at a second UE, a first data; determining a destination of the first data; and transmitting the first data to the destination of the first data in response to the destination of the first data being not the second UE. In addition, the size information for each packet may be indicated in the header of an adaptation layer in response to multiple packets from the different UE bearers can be multiplexed to one PDU of the adaptation layer.

20 Claims, 16 Drawing Sheets

(51) Int. Cl.
*H04W 76/20* (2018.01)
*H04W 92/18* (2009.01)

(56) References Cited

U.S. PATENT DOCUMENTS

| | | | | |
|---|---|---|---|---|
| 2020/0187298 | A1 | 6/2020 | Chun | |
| 2020/0280827 | A1* | 9/2020 | Fechtel | H04W 8/08 |
| 2021/0329487 | A1* | 10/2021 | Wang | H04W 8/005 |
| 2021/0329689 | A1* | 10/2021 | Agiwal | H04W 72/535 |
| 2022/0104035 | A1* | 3/2022 | Tenny | H04W 4/50 |
| 2022/0150893 | A1* | 5/2022 | Deng | H04W 76/14 |
| 2022/0216945 | A1* | 7/2022 | Xu | H04L 5/0053 |
| 2022/0303866 | A1* | 9/2022 | Zhang | H04W 40/22 |
| 2023/0063139 | A1* | 3/2023 | Du | H04W 40/22 |
| 2023/0370902 | A1* | 11/2023 | Wang | H04W 28/0268 |
| 2024/0057203 | A1* | 2/2024 | Wu | H04W 36/08 |

OTHER PUBLICATIONS

PCT/CN2020/122392, "International Preliminary Report on Patentability", PCT Application No. PCT/CN2020/122392, May 4, 2023, 6 pages.

PCT/CN2020/122392, "International Search Report and Written Opinion", PCT Application No. PCT/CN2020/122392, Jul. 12, 2021, 7 pages.

ZTE, "Discussion on PC5 carrier aggregation", 3GPP TSG-RAN WG2 Meeting #99, R2-1708509, Berlin, Germany [retrieved May 22, 2023]. Retrieved from the Internet <https://www.3gpp.org/ftp/tsg_ran/wg2_rl2/TSGR2_99/Docs/>., Aug. 2017, 6 Pages.

* cited by examiner

METHOD AND APPARATUS FOR WIRELESS COMMUNICATION

TECHNICAL FIELD

Embodiments of the present disclosure generally relate to wireless communication technology, especially to coverage extension based on sidelink communication in a wireless communication system.

BACKGROUND

Wireless communication systems are widely deployed to provide various telecommunication services such as telephony, video, data, messaging, broadcasts, and so on. Wireless communication systems may employ multiple access technologies capable of supporting communication with multiple users by sharing available system resources (e.g., time, frequency, and power). Examples of wireless communication systems may include fourth generation (4G) systems such as long term evolution (LTE) systems, LTE-advanced (LTE-A) systems, or LTE-A Pro systems, and fifth generation (5G) systems which may also be referred to as new radio (NR) systems.

In the above wireless communication systems, a user equipment (UE) may communicate with another UE via a data path supported by an operator's network, e.g., a cellular or a Wi-Fi network infrastructure. The data path supported by the operator's network may include a base station (BS) and multiple gateways.

Some wireless communication systems may support sidelink (SL) communications, in which devices (e.g., UEs) that are relatively close to each other may communicate with one another directly via a SL, rather than being linked through the BS. The term "SL" may refer to a direct radio link established for communicating among devices, as opposed to communicating via the cellular infrastructure (uplink and downlink) as discussed above. The term "SL" may also be referred to as a sidelink communication link.

A relaying function based on a sidelink may be supported in a communication network. For example, a UE supporting sidelink communication may function as a relay node to extend the coverage of a BS. An out-of-coverage UE may communicate with a BS via a relay UE. In the context of the present disclosure, a UE, which functions as a relay between another UE and a BS, may be referred to a UE-to-network relay or a U2N relay. There is a need for efficiently performing communication in a communication system supporting a U2N relay.

SUMMARY

According to some embodiments of the present disclosure, a method may include: establishing a radio resource control (RRC) connection between a first user equipment (UE) and a base station (BS) via a second UE, wherein a PC5 RRC connection between the first UE and the second UE has been established and an RRC connection between the second UE and the BS has been established; receiving, from either the first UE or the BS at a second UE, a first data; determining a destination of the first data; and transmitting the first data to the destination of the first data in response to the destination of the first data not being the second UE.

In some embodiments of the present disclosure, the method may further include: decoding the first data into a sidelink adaptation layer (SLAP) protocol data unit (PDU), wherein the SLAP PDU may include at least one sub-header and at least one service data unit (SDU), each of the at least one sub-header corresponds to a respective one of the at least one SDU, and each sub-header may include a length indicator indicating the length of a corresponding SDU and a field size indicator indicating the size of the length indicator. In some embodiments, the SLAP PDU may include at least two SDUs associated with different UE bearers. In some embodiments, the field size indicator may include at least one bit. A value of the field size indicator being "0" and a value of the field size indicator being "1" may indicate different length indicator sizes.

In some embodiments of the present disclosure, the method may further include: decoding the first data into a sidelink adaptation layer (SLAP) protocol data unit (PDU), wherein a header of the SLAP PDU may include an indicator indicating that an identity of a source of the first data is not included in the header of the SLAP PDU.

In some embodiments of the present disclosure, in response to the destination of the first data not being the second UE, the method may further include: encoding the first data into a sidelink adaptation layer (SLAP) protocol data unit (PDU), wherein a header of the SLAP PDU may include an indicator indicating that an identity of a source of the first data is included in the header of the SLAP PDU and the identity of the source of the first data; wherein transmitting the first data to the destination of the first data may include transmitting the SLAP PDU to the destination of the first data.

In some embodiments of the present disclosure, the method may further include: receiving, from a third UE at the second UE, a second data to the BS, wherein the third UE is in communication with the BS via the second UE; and receiving, from the first UE, a third data to the BS; and in response to the destination of the first data being the BS, multiplexing the first data, the second data and the third data for transmitting to the BS.

In some embodiments of the present disclosure, multiplexing the first data, the second data and the third data may include: encoding the first data into a first sidelink adaptation layer (SLAP) service data unit (SDU); encoding the second data into a second SLAP SDU; encoding the third data into a third SLAP SDU; and multiplexing the first SLAP SDU, the second SLAP SDU and the third SLAP SDU into a SLAP protocol data unit (PDU), wherein the first SLAP SDU and the third SLAP SDU are arranged next to each other in the SLAP PDU. In some embodiments, the second SLAP SDU and one of the first SLAP SDU and the third SLAP SDU are associated with different UE bearers.

According to some other embodiments of the present disclosure, a method may include establishing, at a first user equipment (UE), a radio resource control (RRC) connection with a base station (BS) via a second UE, wherein a PC5 RRC connection between the first UE and the second UE has been established and an RRC connection between the second UE and the BS has been established; encoding upper layer data into a sidelink adaptation layer (SLAP) protocol data unit (PDU); and transmitting the SLAP PDU to the BS, wherein the SLAP PDU may include a header of the SLAP PDU including at least one sub-header and at least one service data unit (SDU), each of the at least one sub-header corresponds to a respective one of the at least one SDU, and each sub-header may include a length indicator indicating the length of a corresponding SDU and a field size indicator indicating the size of the length indicator. The SLAP PDU may include at least two SDUs associated with different UE bearers.

The field size indicator may include at least one bit. The value of the field size indicator being "0" and a value of the field size indicator being "1" may indicate different length indicator sizes. The header of the SLAP PDU may include an indicator indicating that a source identity is not included in the header of the SLAP PDU.

According to some other embodiments of the present disclosure, a method may include establishing, at a first user equipment (UE), a radio resource control (RRC) connection with a base station (BS) via a second UE, wherein a PC5 RRC connection between the first UE and the second UE has been established and an RRC connection between the second UE and the BS has been established; receiving, from the BS at the first UE, measurement configuration information; and determining whether to perform a measurement based on the measurement configuration information.

In some embodiments of the present disclosure, the measurement configuration information may indicate a first set of candidate relay UEs connecting to the serving cell of the first UE and a second set of candidate relay UEs not connecting to the serving cell of the first UE.

In some embodiments of the present disclosure, the measurement configuration information may indicate a threshold for a PC5 link. The method may further include: in response to a channel quality of a link between the first UE and the second UE is less than the threshold for the PC5 link, performing measurements towards at least the first set of candidate relay UEs and the second set of candidate relay UEs. The method may further include: in response to the channel quality of the link between the first UE and the second UE becoming an offset less than the channel quality of the link between the first UE and a candidate relay UE within a period, reporting measurement results to the BS. In some embodiments of the present disclosure, the measurement results may indicate an identity of the candidate relay UE received via a discovery message. In some embodiments of the present disclosure, the identity of the candidate relay UE may be one of a layer-2 identity, a cell radio network temporary identifier (C-RNTI), and an inactive radio network temporary identifier (I-RNTI).

According to some other embodiments of the present disclosure, a method may include establishing, at a base station (BS), a radio resource control (RRC) connection with a first user equipment (UE) via a second UE, wherein a PC5 RRC connection between the first UE and the second UE has been established and an RRC connection between the second UE and the BS has been established; transmitting, from the BS to the first UE, measurement configuration information; and receiving measurement results based on the measurement configuration information.

In some embodiments of the present disclosure, the measurement configuration information may indicate a threshold for a PC5 link.

In some embodiments of the present disclosure, the measurement configuration information may indicate a first set of candidate relay UEs connecting to the serving cell of the first UE and a second set of candidate relay UEs not connecting to the serving cell of the first UE. The measurement results may indicate an identity of a candidate relay UE from the first set of candidate relay UEs or the second set of candidate relay UEs. The identity of the candidate relay UE may be one of a layer-2 identity, a cell radio network temporary identifier (C-RNTI), and an inactive radio network temporary identifier (I-RNTI).

In some embodiments of the present disclosure, the method may further include maintaining a mapping between a layer-2 identity and one of a cell radio network temporary identifier (C-RNTI) and an inactive radio network temporary identifier (I-RNTI) of each candidate relay UE from the first set of candidate relay UEs and the second set of candidate relay UEs.

According to some other embodiments of the present disclosure, a method may include transmitting, at a second user equipment (UE), a discovery message for UE discovery, wherein the discovery message may include a layer-2 identity of the second UE or an access stratum (AS) layer identity of the second UE.

In some embodiments of the present disclosure, the AS layer identity may be one of a cell radio network temporary identifier (C-RNTI) and an inactive radio network temporary identifier (I-RNTI).

In some embodiments of the present disclosure, the method may further include: receiving the AS layer identity at an AS layer of the second UE from a base station (BS); delivering the AS layer identity from the AS layer of the second UE to an upper layer of the second UE; adding the AS layer identity to the discovery message at the upper layer of the second UE; and delivering the discovery message to the AS layer of the second UE.

Some embodiments of the present disclosure provide an apparatus. According to some embodiments of the present disclosure, the apparatus may include: at least one non-transitory computer-readable medium having stored thereon computer-executable instructions; at least one receiving circuitry; at least one transmitting circuitry; and at least one processor coupled to the at least one non-transitory computer-readable medium, the at least one receiving circuitry and the at least one transmitting circuitry, wherein the at least one non-transitory computer-readable medium and the computer executable instructions may be configured to, with the at least one processor, cause the apparatus to perform a method according to some embodiments of the present disclosure.

Embodiments of the present disclosure provide technical solutions for supporting the relaying function based on a sidelink, and can facilitate and improve the implementation of various communication technologies such as 5G NR.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of the preferred embodiments of the present disclosure and is not intended to represent the only form in which the present disclosure may be practiced. It should be understood that the same or equivalent functions may be accomplished by different embodiments that are intended to be encompassed within the spirit and scope of the present disclosure.

Reference will now be made in detail to some embodiments of the present disclosure, examples of which are illustrated in the accompanying drawings. To facilitate understanding, embodiments are provided under specific network architecture and new service scenarios, such as the 3rd generation partnership project (3GPP) 5G (NR), 3GPP long-term evolution (LTE) Release 8, and so on. It is contemplated that along with the developments of network architectures and new service scenarios, all embodiments in the present disclosure are also applicable to similar technical problems; and moreover, the terminologies recited in the present disclosure may change, which should not affect the principle of the present disclosure.

Figure 1:
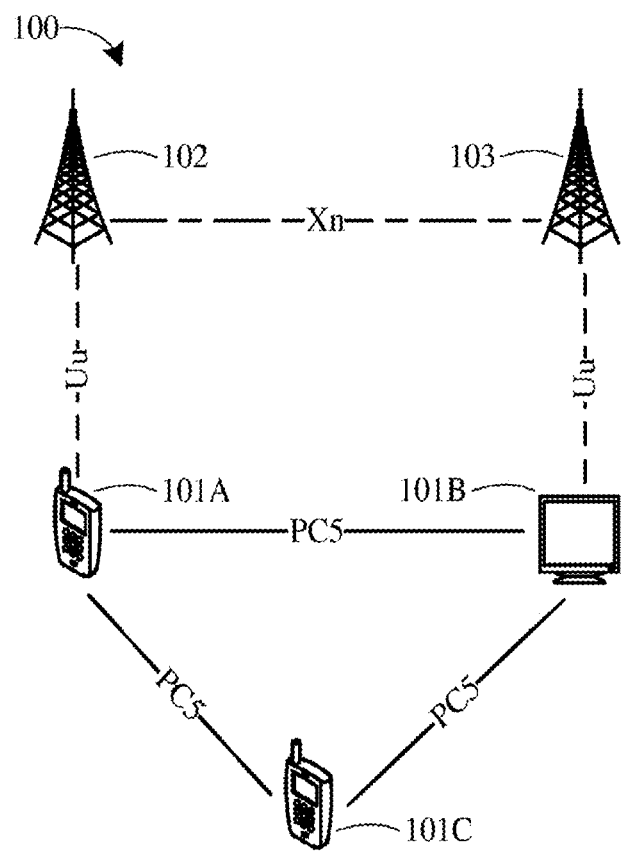
FIG. 1 illustrates a schematic diagram of a wireless communication system in accordance with some embodiments of the present disclosure.

FIG. 1 illustrates a schematic diagram of a wireless communication system 100 in accordance with some embodiments of the present disclosure.

As shown in FIG. 1, the wireless communication system 100 may support sidelink communications. Sidelink communication supports an UE-to-UE direct communication. In the context of the present disclosure, sidelink communications may be categorized according to the wireless communication technologies adopted. For example, sidelink communication may include NR sidelink communication and V2X Sidelink communication.

NR sidelink communications (e.g., specified in 3GPP specification TS 38.311) may refer to access stratum (AS) functionality enabling at least vehicle-to-everything (V2X) communications as defined in 3GPP specification TS 23.287 between neighboring UEs, using NR technology but not traversing any network node. V2X sidelink communications (e.g., specified in 3GPP specification TS 36.311) may refer to AS functionality enabling V2X communications as defined in 3GPP specification TS 23.285 between neighboring UEs, using evolved-universal mobile telecommunication system (UMTS) terrestrial radio access (UTRA) (E-UTRA) technology, but not traversing any network node. However, if being not specified, "sidelink communications" may refer to NR sidelink communications, V2X sidelink communications, or any sidelink communications adopting other wireless communication technologies.

Referring to FIG. 1, the wireless communication system 100 may include some base stations (e.g., BS 102 and BS 103) and some UEs (e.g., UE 101A, UE 101B, and UE 101C). Although a specific number of UEs and BSs are depicted in FIG. 1, it is contemplated that any number of UEs and BSs may be included in the wireless communication system 100.

The UEs and the BSs may support communication based on, for example, 3G, long-term evolution (LTE), LTE-advanced (LTE-A), new radio (NR), or other suitable protocol(s). In some embodiments of the present disclosure, a BS (e.g., BS 102 or BS 103) may be referred to as an access point, an access terminal, a base, a base unit, a macro cell, a Node-B, an evolved Node B (eNB), a gNB, an ng-eNB, a Home Node-B, a relay node, or a device, or described using other terminology used in the art. A UE (e.g., UE 101A, UE 101B, or UE 101C) may include, for example, but is not limited to, a computing device, a wearable device, a mobile device, an IoT device, a vehicle, etc. Persons skilled in the art should understand that as technology develops and advances, the terminologies described in the present disclosure may change, but should not affect or limit the principles and spirit of the present disclosure.

In the example of FIG. 1, the BS 102 and the BS 103 may be included in a next generation radio access network (NG-RAN). In some embodiments of the present disclosure, the BS 102 may be a gNB and the BS 103 may be an ng-eNB.

The UE 101A and UE 101B may be in-coverage (e.g., inside the NG-RAN). For example, as shown in FIG. 1, the UE 101A may be within the coverage of BS 102, and the UE 101B may be within the coverage of BS 103. The UE 101C may be out-of-coverage (e.g., outside the coverage of the NG-RAN). For example, as shown in FIG. 1, the UE 101C may be outside the coverage of any BSs, for example, both the BS 102 and BS 103. The UE 101A and UE 101B may respectively connect to the BS 102 and BS 103 via a network interface, for example, the Uu interface as specified in 3GPP standard documents. The control plane protocol stack in the Uu interface may include a radio resource control (RRC) layer, which may be referred to as a Uu RRC. The BS 102 and BS 103 may be connected to each other via a network interface, for example, the Xn interface as specified in 3GPP standard documents. The UE 101A, UE 101B, and UE 101C may be connected to each other respectively via, for example, a PC5 interface as specified in 3GPP standard documents. The control plane protocol stack in the PC5 interface may include a radio resource control (RRC) layer, which may be referred to as a PC5 RRC.

Support for V2X services via the PC5 interface can be provided by, for example, NR sidelink communication and/or V2X sidelink communication. NR sidelink communication can support one of the following three types of transmission modes for a pair of a source Layer-2 identity and a destination Layer-2 identity: unicast transmission, groupcast transmission, and broadcast transmission. Sidelink communication transmission and reception over the PC5 interface are supported when the UE is either in-coverage or out-of-coverage. For example, the UE 101A, which is within the coverage of the BS 102, can perform sidelink transmission and reception (e.g., sidelink unicast transmission, sidelink groupcast transmission, or sidelink broadcast transmission) over a PC5 interface. The UE 101C, which is outside the coverage of both the BS 102 and BS 103, can also perform sidelink transmission and reception over a PC5 interface.

A UE which supports sidelink communication and/or V2X communication may be referred to as a V2X UE. A V2X UE may be a cell phone, a vehicle, a roadmap device, a computer, a laptop, an IoT (internet of things) device or other type of device in accordance with some other embodiments of the present disclosure.

Figure 2:
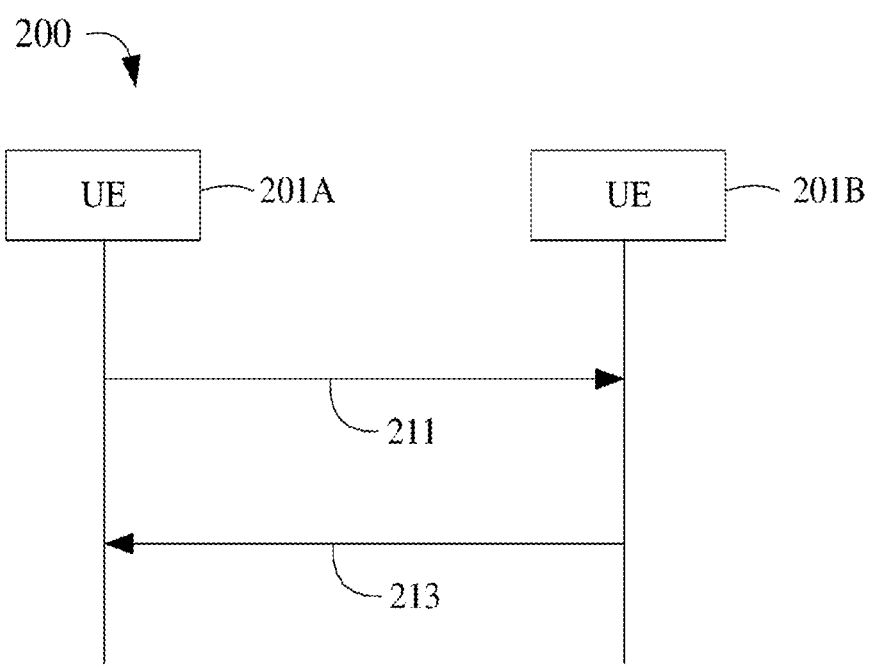
FIG. 2 illustrates an exemplary flowchart of a sidelink RRC reconfiguration procedure in accordance with some embodiments of the present disclosure.

FIG. 2 illustrates an exemplary flowchart of a sidelink RRC reconfiguration procedure 200 in accordance with some embodiments of the present disclosure.

The purpose of the sidelink RRC reconfiguration procedure is to modify a PC5-RRC connection. In some examples, a UE may perform such procedure to establish, modify, or release a sidelink data radio bearer (DRBs). In some examples, a UE may perform such procedure to configure an NR sidelink measurement and reporting. In some examples, a UE may perform such procedure to configure sidelink channel state information (CSI) reference signal resources.

Referring to FIG. 2, UE 201A may initiate a sidelink RRC reconfiguration procedure, and may transmit an RRC reconfiguration sidelink message to a peer UE (e.g., UE 201B) in step 211. A peer UE of the UE 201A refers to a UE that is or will be in sidelink communication with UE 201A.

After receiving the RRC reconfiguration sidelink message, UE 201B may perform corresponding operations, for example, releasing or establishing sidelink DRBs between UE 201A and UE 201B. In the case that UE 201B has successfully performed the operations, UE 201B may transmit an RRC reconfiguration complete sidelink message to UE 201A in step 213. Otherwise, in the case that UE 201B has failed to perform the operations, UE 201B may transmit an RRC reconfiguration failure sidelink message to UE 201A in step 213.

As mentioned above, the relaying function based on a sidelink may be supported in a communication network. In some embodiments of the present disclosure, a UE-to-network relay is supported. For example, an in-coverage UE in communication with an out-of-coverage UE may function as a relay UE between the serving BS of the in-coverage UE and the out-of-coverage UE. In some embodiments of the present disclosure, a UE-to-UE relay is supported. For example, a UE in communication with two or more UEs (e.g., first and third UEs) may function as a relay UE, such that the first UE may communicate with the third UE via the relay UE.

Figure 3:
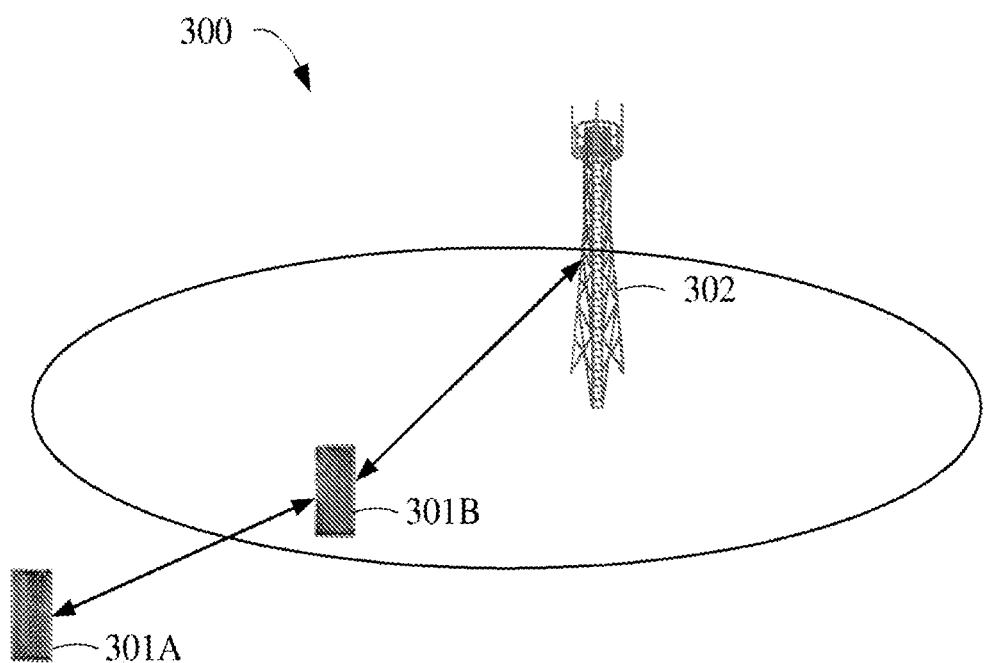
FIG. 3 illustrates a schematic diagram of a wireless communication system in accordance with some embodiments of the present disclosure.

FIG. 3 illustrates a schematic diagram of a wireless communication system 300 in accordance with some embodiments of the present disclosure.

As shown in FIG. 3, the wireless communication system 300 may include a BS (e.g., BS 302) and some UEs (e.g., UE 301A and UE 301B). Although a specific number of UEs and BS are depicted in FIG. 3, it is contemplated that any number of UEs may be included in the wireless communication system 300.

Referring to FIG. 3, UE 301B may be within the coverage of BS 302, and UE 301A may be out-of-coverage. In some examples, UE 301B may function as UE 101A or UE 101B shown in FIG. 1, and UE 301A may function as UE 101C shown in FIG. 1.

The wireless communication system 300 may support sidelink communications. For example, UE 301B may be in sidelink communication with UE 301A. In some embodiments of the present disclosure, UE 301A may initiate a procedure for establishing connection with BS 302 via UE 301B (i.e., UE-to-network relay). After such procedure, UE 301A may access BS 302 via UE 301B. UE 301A and BS 302 may establish an RRC connection therebetween, and UE 301A may have RRC states, such as an RRC_IDLE state, an RRC_INACTIVE state, and an RRC_CONNECTED state. UE 301A may also be referred to as a remote UE and UE 301B may also be referred to as a relay UE.

It should be appreciated by persons skilled in the art that although a single relay node between UE 301A and BS 302 is depicted in FIG. 2, it is contemplated that any number of relay nodes may be included.

Figure 4:
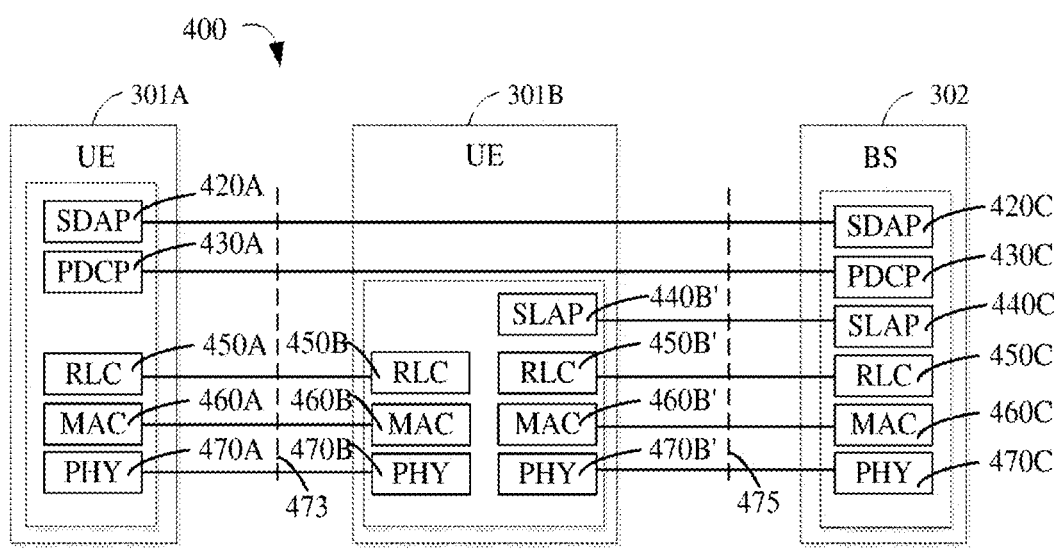
FIG. 4 illustrates an example block diagram of a protocol stack for relaying in accordance with some embodiments of the present disclosure.
Figure 5:
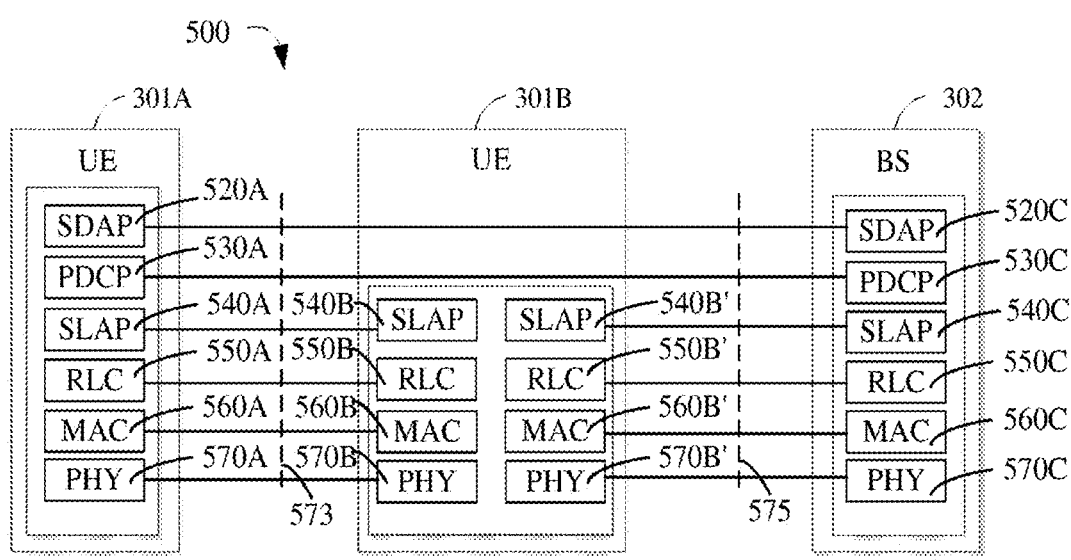
FIG. 5 illustrates an example block diagram of a protocol stack for relaying in accordance with some embodiments of the present disclosure.

After establishing a connection via UE 301B, a User Plane (UP) protocol stack may be established at UE 301A, UE 301B and BS 302. FIG. 4 illustrates an example block diagram of a protocol stack for layer 2 relaying in accordance with some embodiments of the present disclosure. FIG. 5 illustrates another example block diagram of a protocol stack for layer 2 relaying in accordance with some embodiments of the present disclosure.

Referring to FIG. 4, a User Plane (UP) protocol stack 400 may be established at UE 301A, UE 301B and BS 302 to support layer 2 (L2) relaying according to some embodiments of the present disclosure. UE 301A may connect to relay UE 301B via a sidelink (e.g., a PC5 interface 473). The relay UE 301B may connect to BS 302 via a Uu interface 475.

The data flow of the protocol stack 400 is described below.

As illustrated in FIG. 4, the UE 301A protocol stack may include a service data adaptation protocol (SDAP) layer 420A, a packet data convergence protocol (PDCP) layer 430A, a radio link control (RLC) layer 450A, a medium access control (MAC) layer 460A, and a physical (PHY) layer 470A.

At the UE 301A, a higher layer (e.g., Internet Protocol (IP) layer, which is not shown in FIG. 5) may submit IP Packets to the SDAP layer 420A. The SDAP layer 420A may add SDAP headers to SDAP SDUs received from the higher layer to form SDAP Packet Data Units (PDUs), and may submit the SDAP PDUs to a lower layer (e.g., the PDCP layer 430A). The PDCP layer 430A may add PDCP headers to PDCP SDUs received from the SDAP layer 420A, and may submit PDCP PDUs to a lower layer (e.g., the RLC layer 450A). The RLC layer 450A may add RLC headers to RLC SDUs received from the PDCP layer 430A, and may submit RLC PDUs to a lower layer (e.g., the MAC layer 460A). The MAC layer 460A may add MAC headers to MAC SDUs received from the RLC layer 450A to form MAC PDUs, and may submit the MAC PDUs to a lower layer (e.g., the PHY layer 470A). The PHY layer 470A may add information such as Cyclic Redundancy Check (CRC) information to Transport Blocks (TBs) corresponding to the MAC PDUs for transmission. Control information, such as sidelink control information, corresponding to the TBs may also be transmitted.

The UE 301B may include a receiving protocol stack and a transmitting protocol stack. The receiving protocol stack of the UE 301B may include an RLC layer 450B, an MAC layer 460B, and a PHY layer 470B. The transmitting protocol stack of the UE 301B may include a sidelink adaptation protocol (SLAP) layer 440B', an RLC layer 450B', an MAC layer 460B', and a PHY layer 470B'.

The UE 301B may receive data from the UE 301A. For example, at the receiving protocol stack of the UE 301B, the PHY layer 470B may receive and decode data from the UE 301A, and may deliver TBs decoded from the data to an upper layer (e.g., the MAC layer 460B). The MAC layer 460B may decode MAC PDUs corresponding to the TBs, and may deliver MAC SDUs to an upper layer (e.g., the RLC layer 450B). The RLC layer 450B may decode RLC PDUs received from the MAC layer 460B, and may deliver the decoded data (e.g., RLC SDUs) to the transmitting protocol stack of the UE 301B.

The transmitting protocol stack of the UE 301B may receive decoded data from the receiving protocol stack of the UE 301B. For example, the SLAP layer 440B' may receive decoded data from the receiving protocol stack of the UE 301B, and may encode it as SLAP PDUs to be submitted to a lower layer (e.g., RLC layer 450B'). The RLC layer 450B' may encode RLC SDUs from the SLAP layer 440B' as RLC PDUs to be submitted to a lower layer (e.g., MAC layer 460B'). The MAC layer 460B' may encode MAC SDUs from the RLC layer 450B' as MAC PDUs to be submitted to a lower layer (e.g., the PHY layer 470B'). The PHY layer 470B' may add information such as a CRC to the TBs corresponding to the MAC PDUs for transmitting to a destination device (e.g., the BS 302). Control information, such as sidelink control information, corresponding to the TBs may also be transmitted.

The BS 302 protocol stack may include an SDAP layer 420C, a PDCP layer 430C, an SLAP layer 440C, an RLC layer 450C, an MAC layer 460C, and a PHY layer 470C.

The BS 302 may receive data from the UE 301B. For example, the PHY layer 470C may receive and decode data from the UE 301B, and may deliver decoded TBs to an upper layer (e.g., the MAC layer 460C). The MAC layer 460C may decode MAC PDUs corresponding to the TBs, and may deliver MAC SDUs to an upper layer (e.g., the RLC layer 450C). The RLC layer 450C may decode RLC PDUs and may deliver RLC SDUs to an upper layer (e.g., the SLAP layer 440C). The SLAP layer 440C may decode SLAP PDUs and may deliver SLAP SDUs to an upper layer (e.g., the PDCP layer 430C). The PDCP layer 430C may decode PDCP PDUs and may deliver PDCP SDUs to an upper layer (e.g., the SDAP layer 420C). The SDAP layer 420C may decode SDAP PDUs and may deliver SDAP SDUs to an upper layer (e.g., an IP layer, which is not shown in FIG. 5).

FIGS. 4 and 5 differ in that the protocol stack of the UE 301A and the receiving protocol stack of the UE 301B in FIG. 5 include an SLAP layer whereas FIG. 4 does not.

Referring to FIG. 5, a UP protocol stack 500 may be established at UE 301A, UE 301B and BS 302 to support L2 UE-to-Network relay according to some embodiments of the present disclosure. UE 301A may connect to relay UE 301B via a sidelink (e.g., PC5 interface 573). The relay UE 301B may connect to BS 302 via a Uu interface 575.

The UE 301A protocol stack may include a SDAP layer 520A, a PDCP layer 530A, a SLAP layer 540A, a RLC layer 550A, a MAC layer 560A, and a PHY layer 570A. The UE 301B may include a receiving protocol stack and a transmitting protocol stack. The receiving protocol stack of the UE 301B may include a SLAP layer 540B, an RLC layer 550B, an MAC layer 560B, and a PHY layer 570B. The transmitting protocol stack of the UE 301B may include a SLAP layer 540B', an RLC layer 550B', an MAC layer 560B', and a PHY layer 570B'. The BS 302 protocol stack may include an SDAP layer 520C, a PDCP layer 530C, an SLAP layer 540C, an RLC layer 550C, an MAC layer 560C, and a PHY layer 570C.

The data flow of the protocol stack 500 is similar to that as described above with respect to the protocol stack 400 except that at the UE 301A, the PDCP layer 530A may submit PDCP PDUs to the SLAP layer 540A. The SLAP layer 540A may add SLAP headers to SLAP SDUs received from the PDCP layer 530A, and may submit SLAP PDUs to a lower layer (e.g., the RLC layer 550A). In addition, at the UE 301B, the RLC layer 550B may deliver RLC SDUs to the SLAP layer 540B. The SLAP layer 540B may decode SLAP PDUs received from the RLC layer 550B, and may deliver the decoded data (e.g., SLAP SDUs) to the transmitting protocol stack of the UE 301B.

In the protocol stacks 400 and 500, an SLAP layer is introduced. For the relaying process to function properly, the SLAP PDU may include certain information. Embodiments of the present disclosure provide solutions for designing the PDU format of the SLAP layer.

Figure 6A:
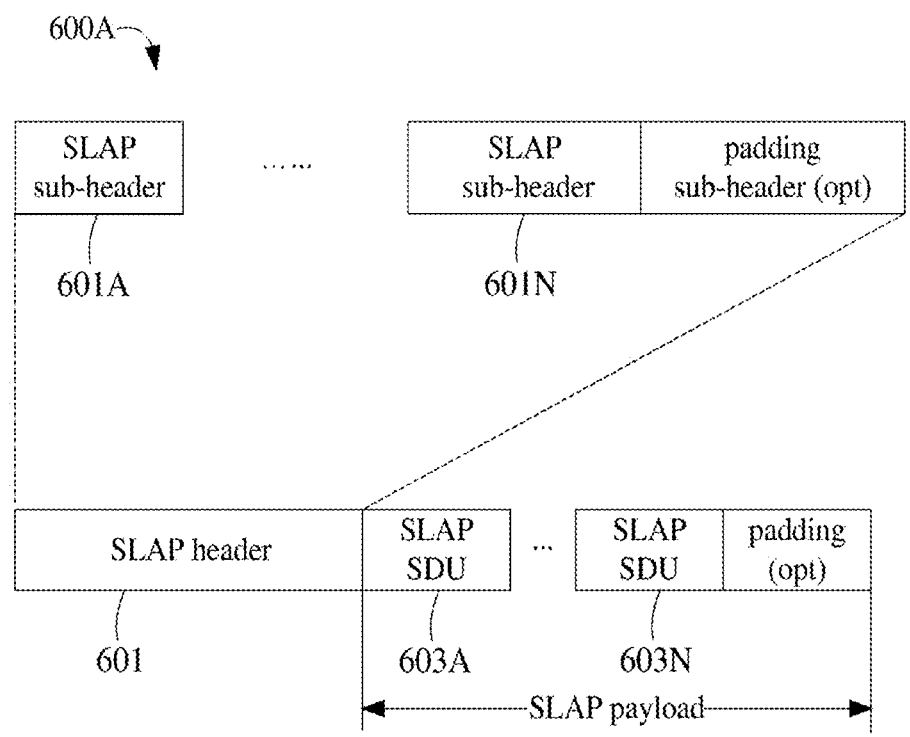
FIG. 6A illustrates an exemplary SLAP PDU in accordance with some embodiments of the present disclosure.
Figure 6B:
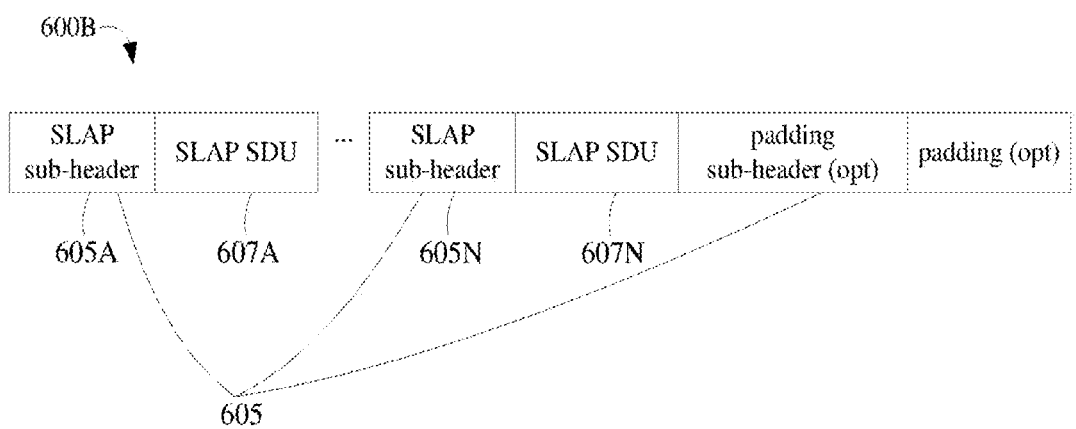
FIG. 6B illustrates an exemplary SLAP PDU in accordance with some embodiments of the present disclosure.

FIGS. 6A and 6B illustrate exemplary formats of SLAP PDU in accordance with some embodiments of the present disclosure.

FIG. 6A illustrates an exemplary SLAP PDU 600A structure according to some embodiments of the present disclosure. As shown in FIG. 6A, SLAP PDU 600A structure may include a SLAP header 601 and at least one SLAP SDU (e.g., SLAP SDU 603A and SLAP SDU 603N). In some embodiments, the SLAP PDU 600A structure may include padding located, for example, at the end of the SLAP PDU.

The SLAP header 601 may include at least one SLAP sub-header (e.g., SLAP sub-header 601A and SLAP sub-header 601N). Each SLAP sub-header of the at least one SLAP sub-header corresponds to a respective one of the at least one SLAP SDU. For example, SLAP sub-header 601A and SLAP sub-header 601N may correspond to SLAP SDU 603A and SLAP SDU 603N, respectively. In some embodiments, the SLAP header 601 may include a padding sub-header corresponding to the padding located, for example, at the end of the SLAP header 601. The at least one SLAP SDU and the padding, if any, may be referred to as SLAP payload. In some embodiments, the SLAP header 601 may start with a common sub-header (not shown in FIG. 6A) followed by SLAP sub-headers and a padding sub-header (if any).

FIG. 6B illustrates an exemplary SLAP PDU 600B structure according to some embodiments of the present disclosure. The SLAP PDU 600B structure may be referred to as an interleave format for SLAP PDU.

As shown in FIG. 6B, SLAP PDU 600B structure may include a SLAP header 605, which includes at least one SLAP sub-header (e.g., SLAP sub-header 605A and SLAP sub-header 605N), and at least one SLAP SDU (e.g., SLAP SDU 607A and SLAP SDU 607N). Each SLAP sub-header of the at least one SLAP sub-header corresponds to a respective one of the at least one SLAP SDU. In some examples, a SLAP PDU may start with a SLAP sub-header, which may be immediately followed by a corresponding SLAP SDU. The SLAP SDU may be immediately followed by another SLAP sub-header, which may be immediately followed by another corresponding SLAP SDU. For example, SLAP sub-header 605A and SLAP sub-header 605N may correspond to SLAP SDU 607A and SLAP SDU 607N, respectively.

In some embodiments, the SLAP PDU 600B structure may include padding and a padding sub-header immediately followed by the padding located, for example, at the end of the SLAP PDU. In some embodiments, the SLAP header 605 may include a common sub-header (not shown in FIG. 6B), and the SLAP PDU 600B structure may start with the common sub-header followed by a SLAP sub-header and a SLAP SDU in sequence.

In some embodiments of the present disclosure, at least one IP packet is allowed to be included in a SLAP PDU format. In some examples, a plurality of packets associated with the same or different UE bearers can be multiplexed into a single SLAP PDU. The corresponding UE bearer ID(s) may be added to the SLAP sub-header.

For example, referring to FIG. 6A, SLAP SDUs 603A and 603N may be associated with the same or different UE bearers, and SLAP sub-headers 601A and 601N may indicate the corresponding UE bearer(s) associated with SLAP SDUs 603A and 603N, respectively. Similarly, in FIG. 6B, SLAP sub-headers 605A and 605N may indicate the corresponding UE bearer(s) associated with SLAP SDUs 607A and 607N, respectively.

In some embodiments of the present disclosure, a SLAP sub-header (e.g., SLAP sub-headers 601A and 601N in FIG. 6A and SLAP sub-headers 605A and 605N) may include a length indicator indicating the length of a corresponding SDU. The length indicator may indicate the length of a corresponding SDU in units of bytes.

In some embodiments of the present disclosure, a SLAP sub-header may further include a field size indicator indicating the size of the length indicator. The field size indicator may include at least one bit. In some examples, the value of the field size indicator being "0" may indicate m bits of the field of length indicator and the value of the field size indicator being "1" may indicate n bits of the field of length indicator. The values of m and n may be different. For example, m may be equal to 15 and n may be equal to 8, or vice versa.

In some embodiments of the present disclosure, a SLAP header (SLAP header 601 or SLAP header 605) may indicate the number of SDUs in the SLAP PDU. For example, the number of SDUs may be indicated in a common sub-header of the SLAP header. In this way, a receiving UE or BS can know which SDU is the last one, and may stop decoding after the receiving UE or BS monitors the last SDU.

In some embodiments of the present disclosure, the identity of the source of the data packets may be included or not included in a SLAP header. The SLAP header (SLAP header 601 or SLAP header 605) may include an indicator indicating whether the identity of the source of the data packets is included in the SLAP header or not. For example, the value of this indicator being "1" may indicate that the source ID is not included, the value of this indicator being "0" may indicate that the source ID is included; or vice versa.

For example, referring to FIG. 5, when UE 301A transmits data to BS 302 via UE 301B, in the first hop between UE 301A and UE 301B, a source UE ID (e.g., the ID of UE 301A) is not included in the SLAP header since a UE ID of UE301A may have already been included in the physical layer and the MAC layer. For example, a L2 UE ID may include 24 bits. A portion (e.g., 8 bits) of a L2 UE ID and the remaining portion (e.g., 16 bits) of the L2 UE ID are included in the physical layer and the MAC layer, respectively. In this case, the above-mentioned indicator in the SLAP header indicates that an identity of the source of the data is not included in the header of the SLAP PDU.

In the second hop between UE 301B and BS 302, UE 301B may need to indicate from which remote UE the delivered packet is. Therefore, a source UE ID (e.g., the ID of UE 301A) may need to be included in the SLAP header. In this case, the above-mentioned indicator in the SLAP header indicates that an identity of the source of the data is included in the header of the SLAP PDU.

Similarly, when BS 302 transmits data to UE 301A via UE 301B, in the first hop between BS 302 and UE 301B, the identity of the source (e.g., BS 302) of the data is not included in the SLAP header. In this case, the above-mentioned indicator in the SLAP header indicates that an identity of the source of the data is not included in the header of the SLAP PDU. In the second hop between UE 301B and UE 301A, the above-mentioned indicator in the SLAP header indicates that an identity of the source of the data is included in the header of the SLAP PDU.

From the perspective of a source UE or transmitting UE, a SLAP PDU can include SDUs associated with the same or different UE bearers. In some embodiments of the present disclosure, the SLAP SDUs in a SLAP PDU may be arranged in a manner that SLAP SDUs associated with the same UE bearer are arranged next to each other in the SLAP PDU.

From the perspective of a relay UE, a SLAP PDU generated by the relay UE can include packets originally from different remote UEs to the BS. In some embodiments of the present disclosure, a SLAP PDU generated by the relay UE can include SDUs associated with the same or different UE bearers from the same UE, and/or SDUs associated with different UE bearers from different UEs. Similarly, from the perspective of a BS, a SLAP PDU received or generated by the BS can include packets originally from or destined for different remote UEs. In some embodiments of the present disclosure, the SLAP SDUs in a SLAP PDU may be arranged in a manner that SLAP SDUs associated with the same UE are arranged next to each other in the SLAP PDU.

For example, a relay UE may receive SDU #1 and SDU #2 from remote UE #1 and remote UE #2, respectively, and receive SDU #3 from remote UE #1. The relay UE may reorder the received SDUs and may arrange the SDUs from the same remote UE next to each other. For example, when SDU #1, SDU #2, and SDU #3 are multiplexed into the same SLAP PDU, SDU #1 and SDU #3 may be placed together, that is, arranged next to each other.

Figure 7:
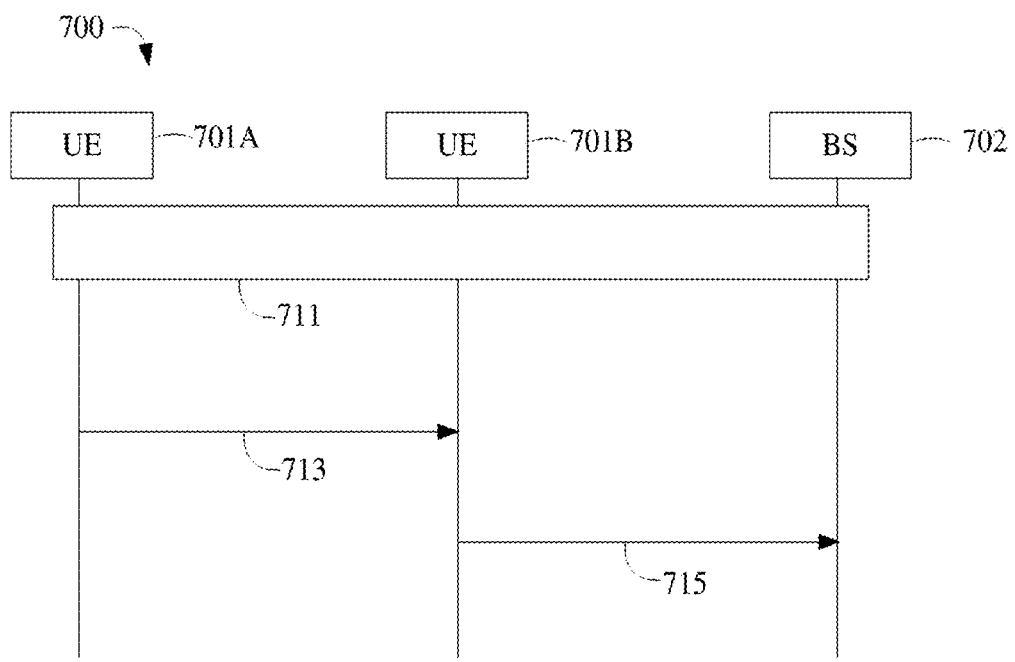
FIG. 7 illustrates an exemplary procedure for wireless communication via a UE-to-network relay in accordance with some embodiments of the present disclosure.

FIG. 7 illustrates an exemplary procedure 700 for wireless communication via a UE-to-network relay in accordance with some embodiments of the present disclosure. Details described in all of the foregoing embodiments of the present disclosure are applicable for the embodiments shown in FIG. 7.

Referring to FIG. 7, in step 711, UE 701A is in sidelink communication with UE 701B, and UE 701B is accessing BS 702. In other words, a PC5 RRC connection has been established between UE 701A and UE 701B, and a Uu RRC connection has been established between UE 701B and BS 702. In the case that UE 701B functions as a L2 relay, an end-to-end RRC connection can be established between UE 701A and BS 702. For example, UE 701A (also referred to as a remote UE) may transmit an RRC setup request to BS 702 via UE 701B (also referred to as a relay UE). BS 702 may transmit an RRC setup message including a response to UE 701A via UE 701B.

After establishing a connection with UE 701A, BS 702 may, in step 711, transmit a reconfiguration message to UE 701A. In some embodiments, BS 702 may configure logical channel group (LCG) or logical channels (LCHs) between a remote UE (e.g., UE 701A) and a relay UE (e.g., UE 701B) for data terminated at BS 702 (i.e., the destination of the data is the BS). This means that data terminated at a relay UE (i.e., the destination of the data is the relay UE) will not be multiplexed to the data terminated at a BS. In some embodiments, when data terminated at a BS and data terminated at a relay UE can be multiplexed into a LCH between the remote UE and the relay UE, the header of the corresponding SLAP PDU may indicate whether the data is terminated at the BS or the relay UE. For example, referring to FIG. 6A, SLAP sub-header 601A may indicate whether SLAP SDU 603A is terminated at the BS or the relay UE.

After establishing a connection with BS 702, UE 701A may transmit data terminated at BS 702 to UE 701B. For example, UE 701A may encode upper layer (e.g., IP layer or application layer) data into a SLAP PDU. The SLAP PDU may include a SLAP header and at least one SDU. The SLAP header may include at least one sub-header, and each of the at least one sub-header may correspond to a respective one of the at least one SDU. For example, SLAP PDU 600A structure or SLAP PDU 600B structure may be employed.

In some embodiments of the present disclosure, one or more packets are allowed to be included in a SLAP PDU format. In some examples, a plurality of packets associated with the same or different UE bearers can be multiplexed into a single SLAP PDU. The UE bearer ID(s) may be added to the corresponding SLAP sub-header(s).

In some embodiments of the present disclosure, a SLAP sub-header may include a length indicator indicating the length of a corresponding SDU. The length indicator may indicate the length of a corresponding SDU in units of bytes. In some embodiments of the present disclosure, a SLAP sub-header may further include a field size indicator indicating the size of the length indicator. The field size indicator may include at least one bit. In some examples, the value of the field size indicator being "0" may indicate m bits (e.g., 8 bits) of the field of length indicator and the value of the field size indicator being "1" may indicate n bits (e.g., 15 bits) of the field of length indicator.

For example, the structure of the SLAP sub-header may include fields such as F/UE ID/UE bearer/L, wherein "F" denotes a field for the field size indicator, "UE ID" denotes a field for the ID of the source UE, "UE bearer" denotes a field for the ID of the UE bearer associated with the corresponding SLAP SDU, and "L" denotes a field for the length indicator. As described above and will be further explained below, the SLAP sub-header (e.g., "UE ID" field) may not indicate the ID of the source in some circumstances.

In some embodiments of the present disclosure, the SLAP header may indicate the number of SDUs in the SLAP PDU.

In some embodiments of the present disclosure, in the case that protocol stack 500 is employed at UE 701A, a SLAP header may include an indicator indicating whether the identity (ID) of the source of the data packets is included in the SLAP header or not. In some examples, the value of this indicator being "1" may indicate that the source ID is not included, the value of this indicator being "0" may indicate that the source ID is included; or vice versa. In the case of UE 701A transmitting data to BS 702 via UE 701B, the UE ID of UE 701A may have already been included in the physical layer and the MAC layer, the above-mentioned indicator in the header of the SLAP PDU generated by UE 701A indicates that an identity of the source of the data is not included in the header of the SLAP PDU.

In step 713, UE 701A may transmit the SLAP PDU to UE 701B, which may forward it to BS 702. For example, UE 701A may submit the SLAP PDU to a lower layer (e.g., RLC layer), which may finally reach the PHY layer. The PHY layer may transmit corresponding data to UE 701B.

In response to receiving the data (hereinafter, "first data") from UE 701A, UE 701B may determine the destination of the first data. In response to the destination of the first data being not UE 701B, but is, for example, BS 702, UE 701B may transmit the first data to BS 702 in step 715. In some embodiments of the present disclosure, UE 701B may determine the destination of the first data based on the LCH corresponding to the first data or the SLAP header (for example, the SLAP header may indicate the destination of the data).

In some embodiments of the present disclosure, UE 701B, as a relay node, may receive data originally from different remote UEs to a BS (e.g., BS 702). For example, SDU #1 and SDU #2 are from UE 701A and another remote UE (hereinafter, UE #3), respectively, and SDU #3 is from UE 701A. UE 701B may reorder the received SDUs (e.g., SDU #1, SDU #2, and SDU #3) and may arrange SDUs from the same remote UE next to each other. For instance, when SDU #1, SDU #2, and SDU #3 are multiplexed into the same SLAP PDU, SDU #1 and SDU #3 may be placed arranged next to each other, for example, in a sequence of SDU #1, SDU #3, SDU #2.

In some embodiments of the present disclosure, the header of the SLAP PDU generated by UE 701B may indicate that an identity of the source of the data is included in the header of the SLAP PDU.

It should be appreciated by persons skilled in the art that the sequence of the operations in exemplary procedure 700 may be changed and some of the operations in exemplary procedure 700 may be eliminated or modified, without departing from the spirit and scope of the disclosure.

Figure 8:
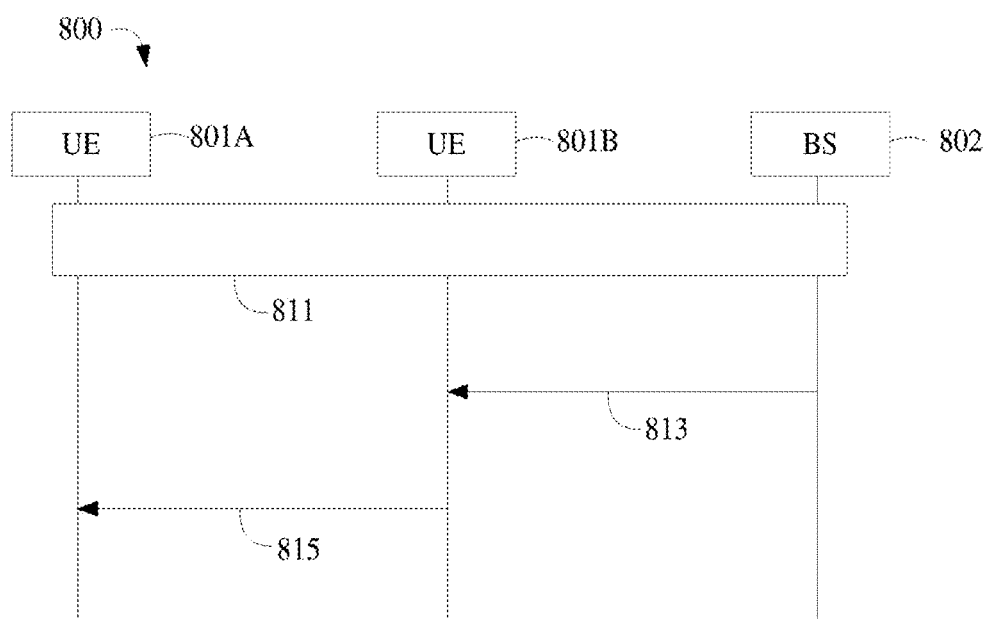
FIG. 8 illustrates an exemplary procedure for wireless communication via a UE-to-network relay in accordance with some embodiments of the present disclosure.

FIG. 8 illustrates an exemplary procedure 800 for wireless communication via a UE-to-network relay in accordance with some embodiments of the present disclosure. Details described in all of the foregoing embodiments of the present disclosure are applicable for the embodiments shown in FIG. 8.

Referring to FIG. 8, in step 811, UE 801A is in sidelink communication with UE 801B, and UE 801B is accessing BS 802. In other words, a PC5 RRC connection has been established between UE 801A and UE 801B, and a Uu RRC connection has been established between UE 801B and BS 802. In the case that UE 801B functions as a L2 UE-to-Network relay, an end-to-end RRC connection can be established between UE 801A and BS 802. For example, UE 801A (also referred to as a remote UE) may transmit an RRC setup request to BS 802 via UE 801B (also referred to as a L2 UE-to-Network relay UE). BS 802 may transmit an RRC setup message including a response to UE 801A via UE 801B.

After establishing a connection with UE 801A, BS 802 may, in step 811, transmit a reconfiguration message to UE 801A. In some embodiments, BS 802 may configure a logical channel group (LCG) or logical channels (LCHs) between a remote UE (e.g., UE 801A) and a relay UE (e.g., UE 801B) for data terminated at BS 802 (i.e., the destination of the data is the BS). This means that data terminated at a relay UE (i.e., the destination of the data is the relay UE) will not be multiplexed to the data terminated at a BS. In some embodiments, when data terminated at a BS and data terminated at a relay UE can be multiplexed into a LCH between the remote UE and the relay UE, the header of the corresponding SLAP PDU may indicate whether the data is terminated at the BS or the relay UE. For example, referring to FIG. 6A, SLAP sub-header 601A may indicate whether SLAP SDU 603A is terminated at the BS or the relay UE.

After establishing a connection with BS 802, BS 802 may transmit data destined for UE 801A via UE 801B. BS 802 may generate a SLAP PDU. The SLAP PDU may include a SLAP header and at least one SDU. The SLAP header may include at least one sub-header, and each of the at least one sub-header may correspond to a respective one of the at least one SDU. In some examples, SLAP PDU 600A structure or SLAP PDU 600B structure may be employed.

In some embodiments of the present disclosure, one or more packets are allowed to be included in a SLAP PDU format. In some examples, a plurality of packets associated with the same or different UE bearers can be multiplexed into a single SLAP PDU. The UE bearer ID(s) may be added to the corresponding SLAP sub-header(s).

In some embodiments of the present disclosure, a SLAP sub-header may include a length indicator indicating the length of a corresponding SDU. The length indicator may indicate the length of a corresponding SDU in units of bytes. In some embodiments of the present disclosure, a SLAP sub-header may further include a field size indicator indicating the size of the length indicator. The field size indicator may include at least one bit. In some examples, the value of the field size indicator being "0" may indicate m bits (e.g., 8 bits) of the field of length indicator and the value of the field size indicator being "1" may indicate n bits (e.g., 15 bits) of the field of length indicator.

For example, the structure of the SLAP sub-header may include fields such as F/UE ID/UE bearer/L, wherein "F" denotes a field for the field size indicator, "UE ID" denotes a field for the ID of the source UE, "UE bearer" denotes a field for the ID of the UE bearer associated with the corresponding SLAP SDU, and "L" denotes a field for the length indicator. As described above and will be further explained below, the SLAP sub-header (e.g., "UE ID" field) may not indicate the ID of the source in some circumstances.

In some embodiments of the present disclosure, the SLAP header may indicate the number of SDUs in the SLAP PDU.

In some embodiments of the present disclosure, a SLAP header may include an indicator indicating whether the identity (ID) of the source of the data packets is included in the SLAP header or not. In some examples, the value of this indicator being "1" may indicate that the source ID is not included, the value of this indicator being "0" may indicate that the source ID is included; or vice versa. In the case of BS 802 transmitting data to UE 801A via UE 801B, the ID of BS 802 may have already been included in the physical layer and the MAC layer, the above-mentioned indicator in the header of the SLAP PDU generated by BS 802 indicates that an identity of the source of the data is not included in the header of the SLAP PDU.

In some examples, a plurality of packets associated with the same or different UEs can be multiplexed into a single SLAP PDU. For example, BS 802 may generate a SLAP PDU including SDUs for different remote UEs via a common relay node. For example, SDU #1 and SDU #2 are for UE 801A and another remote UE (hereinafter, UE #3), respectively, and SDU #3 is from UE 801A. UE #3 is in communication with BS 802 via UE 801B. BS 802 may reorder the SDUs (e.g., SDU #1, SDU #2, and SDU #3) and may arrange SDUs for the same remote UE next to each other. For instance, when SDU #1, SDU #2, and SDU #3 are multiplexed into the same SLAP PDU, SDU #1 and SDU #3 may be arranged next to each other, for example, in a sequence of SDU #1, SDU #3, SDU #2.

In step 813, BS 802 may transmit the SLAP PDU to UE 801B, which may forward it to UE 801A. For example, BS 802 may submit the SLAP PDU to a lower layer (e.g., RLC layer), which may finally reach the PHY layer. The PHY layer may transmit corresponding data to UE 801B.

In response to receiving the data (hereinafter, "first data") from BS 802, UE 801B may determine the destination of the first data. In response to the destination of the first data being not UE 801B, but is, for example, UE 801A, UE 801B may transmit the first data to UE 801A in step 815. In some embodiments of the present disclosure, UE 801B may determine the destination of the first data based on the SLAP header (for example, BS 802 may add a remote UE ID to the SLAP header).

In some embodiments of the present disclosure, UE 801B may de-multiplex SDUs for different remote UEs and may generate a SLAP PDU including SDU(s) for the same UE. In some embodiments of the present disclosure, the header of the SLAP PDU generated by UE 801B may indicates that an identity of the source of the data is included in the header of the SLAP PDU.

It should be appreciated by persons skilled in the art that the sequence of the operations in exemplary procedure 800 may be changed and some of the operations in exemplary procedure 800 may be eliminated or modified, without departing from the spirit and scope of the disclosure.

Figure 9:
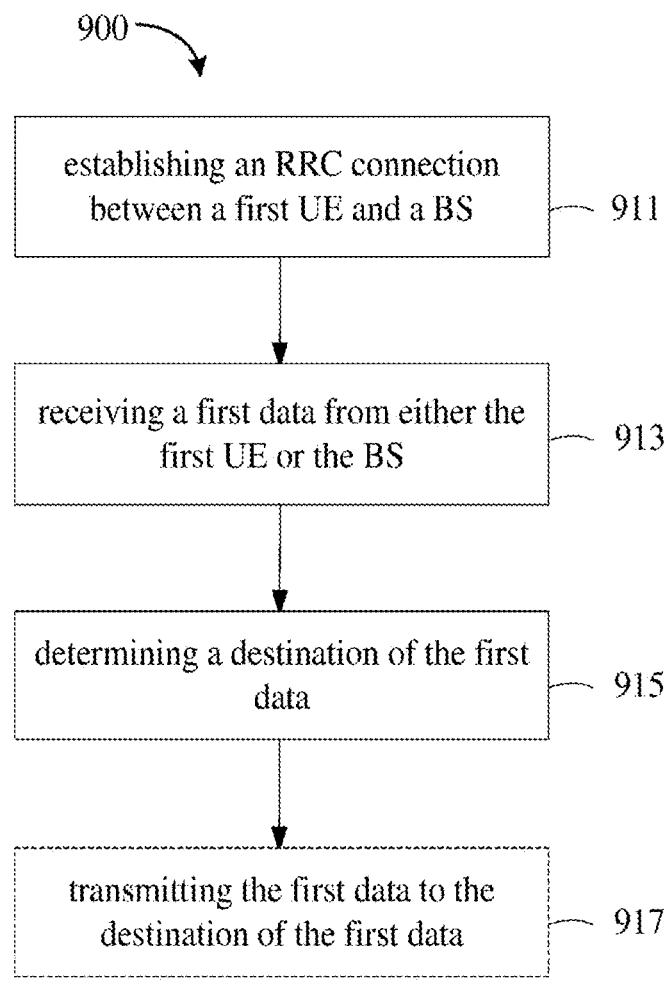
FIG. 9 illustrates an exemplary procedure for wireless communication in accordance with some embodiments of the present disclosure.

FIG. 9 illustrates an exemplary procedure 900 for wireless communication in accordance with some embodiments of the present disclosure. Details described in all of the foregoing embodiments of the present disclosure are applicable for the embodiments shown in FIG. 9. In some examples, the procedure may be performed by a UE, for example, UE 701B in FIG. 7 or UE 801B in FIG. 8.

Referring to FIG. 9, an RRC connection between a UE (hereinafter, "second UE") and a BS has been established. A PC5 RRC connection between the second UE and another UE (hereinafter, "first UE") has been established. In operation 911, the second UE may facilitate establishing an RRC connection between the first UE and the BS. In operation 913, the second UE may receive data (hereinafter, "first data") from either the first UE or the BS. In operation 915, the second UE may determine the destination of the first data. In operation 917 (denoted by dotted block as an option), the second UE may transmit the first data to the destination of the first data in response to the destination of the first data being not the second UE. For example, the first data may be from the BS to the first UE, or from the first UE to the BS.

In response to receiving the first data, the second UE may decode the first data into a SLAP PDU.

In some embodiments of the present disclosure, the SLAP PDU may include at least one sub-header and at least one SDU. For example, SLAP PDU 600A structure or SLAP PDU 600B structure may be employed. Each of the at least one sub-header may correspond to a respective one of the at least one SDU. In some examples, each of the at least one sub-header may include a length indicator indicating the length of a corresponding SDU and a field size indicator indicating the size of the length indicator. In some embodiments of the present disclosure, the SLAP PDU may include at least two SDUs associated with different UE bearers.

In some embodiments of the present disclosure, the field size indicator may include at least one bit. The value of the field size indicator being "0" and a value of the field size indicator being "1" may indicate different length indicator sizes (e.g., 8 bits and 15 bits, respectively).

In some embodiments of the present disclosure, a header of the SLAP PDU may include an indicator indicating that an identity (ID) of a source of the first data is not included in the header of the SLAP PDU. For example, the value of this indicator being "1" may indicate that the source ID is not included, the value of this indicator being "0" may indicate that the source ID is included; or vice versa.

In some embodiments of the present disclosure, in response to the destination of the first data being not the second UE, the second UE may encode the first data into a SLAP PDU. A header of the SLAP PDU may include an indicator indicating that an identity (ID) of a source of the first data is included in the header of the SLAP PDU and the identity of the source of the first data. The second UE may, in operation 917, transmit the SLAP PDU to the destination of the first data. For example, the second UE may submit the SLAP PDU to a lower layer (e.g., RLC layer), which may finally reach the PHY layer. The PHY layer may transmit corresponding data to the destination.

In some embodiments of the present disclosure, another UE (hereinafter, "third UE") may be in communication with the BS via the second UE. The second UE may receive data (hereinafter, "second data") from the third UE to the BS. The second UE may receive another data (hereinafter, "third data") from the first UE to the BS. In response to the destination of the first data being the BS, the second UE may multiplex the first data, the second data and the third data for transmitting to the BS.

For example, to multiplex the first data, the second data and the third data, the second UE may encode the first data into a first SLAP SDU, encode the second data into a second SLAP SDU, encode the third data into a third SLAP SDU, and multiplex the first SLAP SDU, the second SLAP SDU and the third SLAP SDU into a SLAP PDU. The SDUs in the same SLAP PDU may be arranged in the manner that the SDUs from the same UE are arranged together. For example, the first SLAP SDU and the third SLAP SDU are arranged next to each other in the SLAP PDU. In some embodiments of the present disclosure, SDUs from different UEs may be associated with different UE bearers. For examples, the second SLAP SDU and one of the first SLAP SDU and the third SLAP SDU are associated with different UE bearers. In some embodiments of the present disclosure, SDUs from the same UE may be associated with the same or different UE bearers. For examples, the first SLAP SDU and the third SLAP SDU may be associated with the same or different UE bearers.

It should be appreciated by persons skilled in the art that the sequence of the operations in exemplary procedure 900 may be changed and some of the operations in exemplary procedure 900 may be eliminated or modified, without departing from the spirit and scope of the disclosure.

Figure 10:
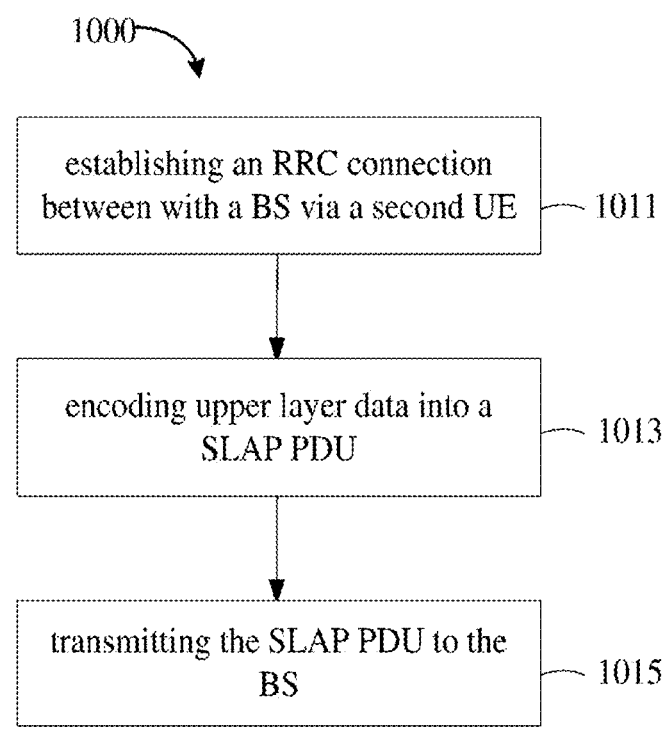
FIG. 10 illustrates an exemplary procedure for wireless communication in accordance with some embodiments of the present disclosure.

FIG. 10 illustrates an exemplary procedure 1000 for wireless communication in accordance with some embodiments of the present disclosure. Details described in all of the foregoing embodiments of the present disclosure are applicable for the embodiments shown in FIG. 10. In some examples, the procedure may be performed by a UE, for example, UE 701A in FIG. 7 or UE 801A in FIG. 8.

Referring to FIG. 10, an RRC connection between a UE (hereinafter, "second UE") and a BS has been established. A PC5 RRC connection between the second UE and another UE (hereinafter, "first UE") has been established. In operation 1011, the first UE may establish an RRC connection with the BS via the second UE.

In operation 1013, the first UE may encode upper layer (e.g., IP layer or application layer) data into a SLAP PDU. The SLAP PDU may include a header of the SLAP PDU, which includes at least one sub-header, and at least one SDU. Each of the at least one sub-header may correspond to a respective one of the at least one SDU. In some embodiments of the present disclosure, each sub-header may include a length indicator indicating the length of a corresponding SDU and a field size indicator indicating the size of the length indicator.

In some embodiments of the present disclosure, the SLAP PDU may include at least two SDUs associated with different UE bearers.

In some embodiments of the present disclosure, the field size indicator may include at least one bit. The value of the field size indicator being "0" and a value of the field size indicator being "1" may indicate different length indicator sizes (e.g., 8 bits and 15 bits, respectively).

In some embodiments of the present disclosure, the header of the SLAP PDU may include an indicator indicating that a source identity (ID) is not included in the header of the SLAP PDU. For example, the value of this indicator being "1" may indicate that the source ID is not included, the value of this indicator being "0" may indicate that the source ID is included; or vice versa.

In operation 1015, the first UE may transmit the SLAP PDU to the BS. For example, the first UE may submit the SLAP PDU to a lower layer (e.g., RLC layer), which may finally reach the PHY layer. The PHY layer may transmit corresponding data to the BS via the second UE.

It should be appreciated by persons skilled in the art that the sequence of the operations in exemplary procedure 1000 may be changed and some of the operations in exemplary procedure 1000 may be eliminated or modified, without departing from the spirit and scope of the disclosure.

When a UE moves from out-of-coverage to in-coverage, the UE may perform a path switch to a direct link between the UE and a BS. Before performing the path switching, the UE may perform a measurement. In addition, the UE may need to perform a measurement(s) towards a candidate relay(s) for the purpose of relay reselection. Embodiments of the present disclosure provide solutions for performing measurements.

In some embodiments of the present disclosure, a BS may configure the criteria or trigger condition for performing a measurement towards, for example, candidate relays and a serving BS. For example, the BS may transmit measurement configuration information to a remote UE via a relay UE.

In some embodiments of the present disclosure, the measurement configuration information may indicate a set of candidate relay UEs connecting to the serving cell of the first UE (hereinafter, "set A") and a set of candidate relay UEs not connecting to the serving cell of the first UE (hereinafter, "set B"). In some examples, set A may have a higher priority than set B.

In some embodiments of the present disclosure, the BS may further configure a threshold for a PC5 link. For example, the measurement configuration information may include the threshold for the PC5 link to trigger the measurement towards, for example, the candidate relays, serving cell and neighbor cells. In response to a channel quality of a link between a remote UE and a relay UE is less (i.e., worse) than the threshold for the PC5 link, the remote UE may perform measurements towards candidate relay UEs. For example, the remote UE may perform measurements towards candidate relay UEs in the configured sets of candidate relay UEs (e.g., set A and set B). In some examples, the remote UE may also perform measurements towards candidate relay UEs that are discovered by the remote UE, but not included in the configured sets of candidate relay UEs. In some examples, the remote UE may also perform measurements towards its serving cell and the neighboring cells.

In some embodiments of the present disclosure, the thresholds for a PC5 link configured to an out-of-coverage UE and to an in-coverage UE may be the same or different.

In some embodiments of the present disclosure, in response to the channel quality of the link between the remote UE and the relay UE becoming an offset less (i.e., worse) than the channel quality of the link between the remote UE and a candidate relay UE within a certain period (hereinafter referred to as "satisfying report condition"), the remote UE may report the measurement results to the BS. The offset and the period may be configured in the measurement configuration information, in different configuration information, or may be predefined. In response to receiving the measurement results, the BS may determine whether a path switch should be performed.

In some embodiments of the present disclosure, the remote UE itself can determine which candidate relay is a suitable one, and may switch to this newly selected relay. The selection of the candidate relay may be based on a ranking. For example, an offset (hereinafter, "w1") may be configured for candidate relays in set A. When w1+$CH_A$>, $CH_B$, where $CH_A$ denotes the channel quality of the link between the remote UE and a candidate relay UE #A from set A and $CH_B$ denotes the channel quality of the link between the remote UE and a candidate relay UE #B from set B, the remote UE may select the candidate relay UE #A in priority.

In some embodiments of the present disclosure, the identity (ID) of the serving relay UE may be included in the measurement result report. Since the remote UE has an RRC connection with the serving relay UE, the remote UE can perform a measurement towards the serving relay UE based on at least one of reference signal (RS) and communication data. The UE ID for the serving relay UE included in the measurement result report may be one of, for example, a layer-2 ID and a cell radio network temporary identifier (C-RNTI).

The identity (ID) of the candidate relay UE (e.g., which satisfies the report condition) may be included in the measurement result report. Since the remote UE does not have a connection with the candidate relay UE, the remote UE can only identify the candidate relay UE based on the discovery message including a demodulation reference signal (DM-RS). In addition, the remote UE may perform a measurement towards such relay UE based on the discovery message. In this case, the UE ID included in the discovery message should be added in the measurement result report. Various types of UE IDs can be included in the discovery message.

In some embodiments of the present disclosure, the UE ID included in a discovery message may be a layer-2 ID. In this case, to differentiate the relay UEs in response to receiving the measurement report from a remote UE, a BS may need to maintain a mapping between a layer-2 ID and an access stratum (AS) layer ID, for example, a C-RNTI or an inactive radio network temporary identifier (I-RNTI).

In some embodiments of the present disclosure, the UE ID included in a discovery message may be an AS layer ID, for example, C-RNTI or I-RNTI. In this case, in order to include the AS layer ID in a discovery message, the AS layer of a UE may indicate the AS layer ID configured by a BS to an upper layer (e.g., PC5-S layer or application layer), which may add the AS layer ID to the discovery message and then deliver the discovery message to the AS layer for transmission.

Figure 11:
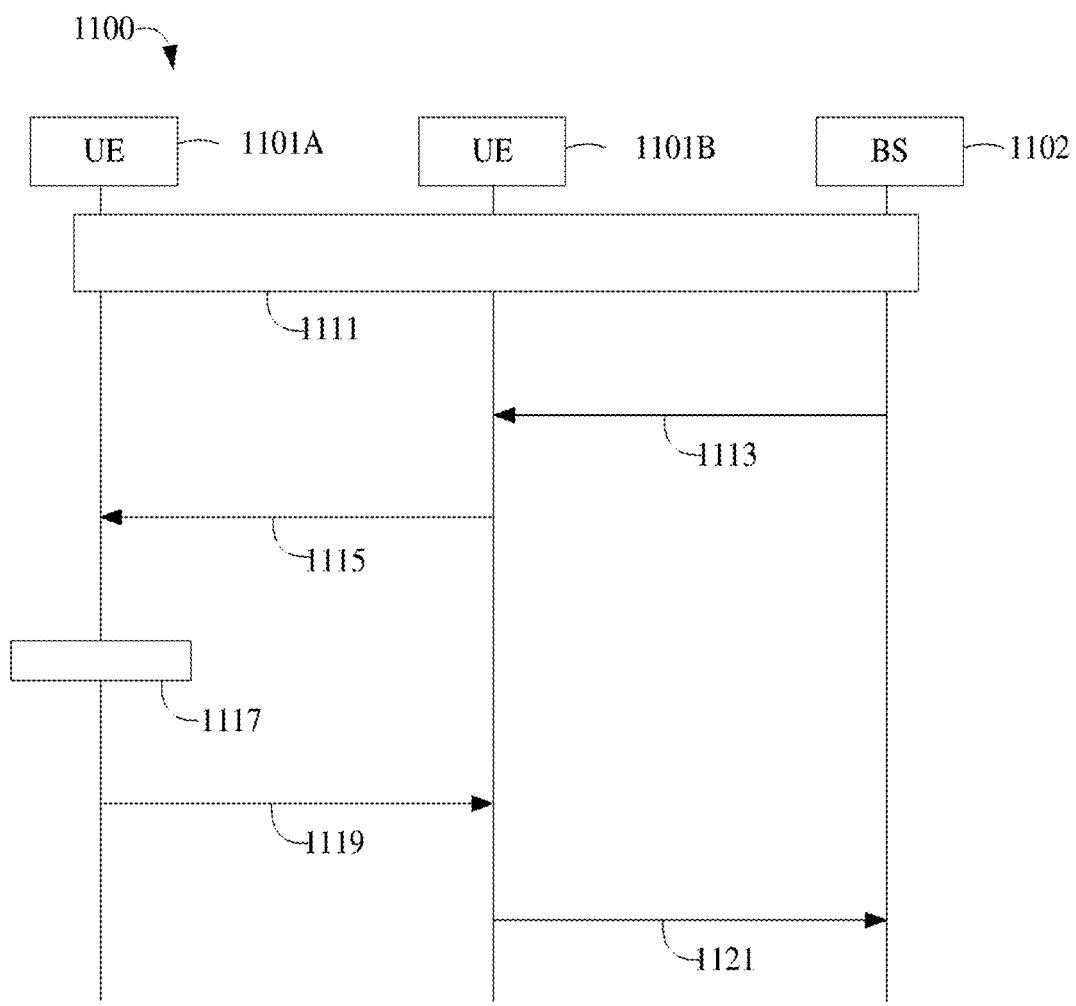
FIG. 11 illustrates an exemplary procedure for wireless communication via a UE-to-network relay in accordance with some embodiments of the present disclosure.

FIG. 11 illustrates an exemplary procedure 1100 for wireless communication via a UE-to-network relay in accordance with some embodiments of the present disclosure.

Details described in all of the foregoing embodiments of the present disclosure are applicable for the embodiments shown in FIG. 11.

Referring to FIG. 11, in step 1111, UE 1101A is in sidelink communication with UE 1101B, and UE 1101B is accessing BS 1102. In other words, a PC5 RRC connection has been established between UE 1101A and UE 1101B, and a Uu RRC connection has been established between UE 1101B and BS 1102. In the case that UE 1101B functions as a L2 relay, an end-to-end RRC connection can be established between UE 1101A and BS 1102. For example, UE 1101A (also referred to as a remote UE) may transmit an RRC setup request to BS 1102 via UE 1101B (also referred to as a relay UE). BS 1102 may transmit an RRC setup message including a response to UE 1101A via UE 1101B.

After establishing a connection with UE 1101A, BS 1102 may transmit a reconfiguration message to UE 1101A via UE 1101B. For example, in step 1113, BS 1102 may transmit the reconfiguration message to UE 1101B, which may, in step 1115, forward the reconfiguration message to UE 1101A. The BS may configure UE 1101A to perform a measurement towards candidate relays and the serving BS. For example, measurement configuration information as described above may be included in the reconfiguration message.

In some embodiments of the present disclosure, the measurement configuration information may indicate a set of candidate relay UEs connecting to the serving cell of UE 1101A ("set A") and a set of candidate relay UEs not connecting to the serving cell of UE 1101A ("set B"). In some examples, set A may have a higher priority than set B. In some embodiments of the present disclosure, the measurement configuration information may further indicate a threshold for a PC5 link. As will be described below, reaching the threshold for the PC5 link may trigger the measurement towards, for example, the candidate relays, serving cell and neighbor cells.

In response to receiving the measurement configuration information, UE 1101A may determine whether to perform the measurements based on the measurement configuration information. For example, in step 1117, UE 1101A may determine whether the condition for a measurement is met, for example, the channel quality of the link between UE 1101A and UE 1101B is less (worse) than the threshold for the PC5 link. In response to a channel quality of a link between the first UE and the second UE is less than the threshold for the PC5 link, UE 1101A may perform measurements towards candidate relay UEs in set A and set B. In some examples, the remote UE may also perform measurements towards its serving cell and neighboring cells. In some examples, UE 1101A may also perform measurements towards candidate relay UEs that are discovered by UE 1101A, but not included in set A and set B.

In response to the channel quality of the link between UE 1101A and UE 1101B becoming an offset less (i.e., worse) than the channel quality of the link between the remote UE and a candidate relay UE within a certain period, UE 1101A may report the measurement results to the BS. For example, in step 1119, UE 1101A may transmit a measurement report including the measurement results to UE 1101B, which may, in step 1121, forward the measurement report to BS 1102. In response to receiving the measurement report, BS 1102 may determine whether to instruct UE 1101A to a suitable node (e.g., a candidate relay UE).

The measurement report may include at least one of the following:

the channel quality (e.g., reference signal received power (RSRP) or reference signal received quality (RSRQ)) associated with the serving relay, UE ID of the serving relay, the cell ID serving this relay;

the channel quality (e.g., RSRP or RSRQ) associated with a candidate relay, UE ID of the candidate relay, the cell ID serving this relay;

the channel quality (e.g., RSRP or RSRQ) associated with the serving cell;

and the channel quality (e.g., RSRP or RSRQ) associated with the candidate cell (e.g., a neighboring cell).

In some embodiments of the present disclosure, as described above, the UE ID in a discovery message is included in the measurement report. For example, UE 1101A may receive a discovery message from a candidate relay UE #C, which may be from either set A or set B. The UE ID of candidate relay UE #C included in the discovery message may be included in the measurement report.

In some embodiments of the present disclosure, the UE ID included in a discovery message may be a layer-2 ID from an upper layer (e.g., an application layer). In this case, to differentiate the relay UEs in response to receiving the measurement report from a remote UE (e.g., UE 1101A), a BS (e.g., BS 1102) may maintain a mapping between a layer-2 ID and an AS layer ID, for example, C-RNTI or I-RNTI.

In some embodiments of the present disclosure, the UE ID included in a discovery message may be an AS layer ID, for example, C-RNTI or I-RNTI. For example, the candidate relay UE #C may receive the AS layer ID at its AS layer from a BS (e.g., BS 1102). The candidate relay UE #C may deliver the AS layer ID from its AS layer to its upper layer (e.g., PC5-S layer or application layer), which may add the AS layer ID to a discovery message, and then deliver the discovery message to the AS layer for transmission.

In some embodiments of the present disclosure, UE 1101A itself can determine which candidate relay is a suitable one, and may switch to this newly selected relay. The selection of the candidate relay may be based on ranking. For example, an offset (hereinafter, "w1") may be configured for candidate relays in set A. When $w1+CH_A >= CH_B$, where $CH_A$ denotes the channel quality of the link between UE 1101A and a candidate relay UE #A from set A and $CH_B$ denotes the channel quality of the link between UE 1101A and a candidate relay UE #B from set B, UE 1101A may select the candidate relay UE #A in priority.

It should be appreciated by persons skilled in the art that the sequence of the operations in exemplary procedure 1100 may be changed and some of the operations in exemplary procedure 1100 may be eliminated or modified, without departing from the spirit and scope of the disclosure.

Figure 12:
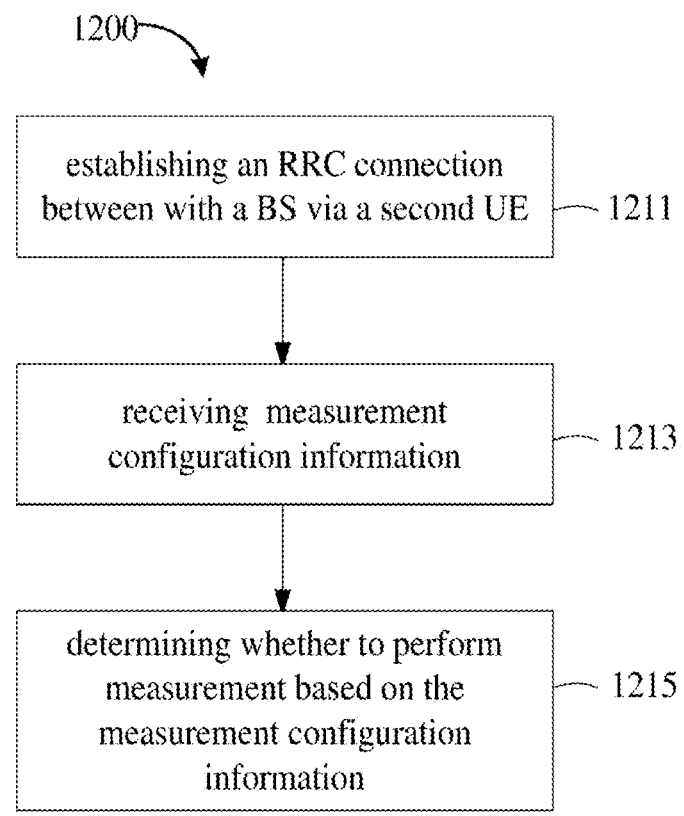
FIG. 12 illustrates an exemplary procedure for wireless communication in accordance with some embodiments of the present disclosure.

FIG. 12 illustrates an exemplary procedure 1200 for wireless communication in accordance with some embodiments of the present disclosure. Details described in all of the foregoing embodiments of the present disclosure are applicable for the embodiments shown in FIG. 12. In some examples, the procedure may be performed by a UE, for example, UE 1101A in FIG. 11.

Referring to FIG. 12, an RRC connection between a UE (hereinafter, "second UE") and a BS has been established. A PC5 RRC connection between the second UE and another UE (hereinafter, "first UE") has been established. In operation 1211, the first UE may establish an RRC connection with the BS via the second UE. In operation 1213, the first UE may receive measurement configuration information from the BS. In some examples, the measurement configuration information may be included in a reconfiguration message. In operation 1215, the first UE may determine whether to perform a measurement based on the measurement configuration information.

In some embodiments of the present disclosure, the measurement configuration information may indicate a first set of candidate relay UEs connecting to the serving cell of the first UE (e.g., set A) and a second set of candidate relay UEs not connecting to the serving cell of the first UE (e.g., set B). In some embodiments of the present disclosure, the measurement configuration information may indicate a threshold for a PC5 link.

In some embodiments of the present disclosure, in response to a channel quality of a link between the first UE and the second UE is less than the threshold for a PC5 link, the first UE may perform measurements towards at least the first set of candidate relay UEs and the second set of candidate relay UEs. In some embodiments of the present disclosure, in response to the channel quality of the link between the first UE and the second UE becoming an offset less than the channel quality of the link between the first UE and a candidate relay UE within a certain period, the first UE may report measurement results to the BS. The candidate relay UE may be one from the first set of candidate relay UEs or the second set of candidate relay UEs.

In some embodiments of the present disclosure, the measurement results may indicate the identity of the candidate relay UE, which may be received via a discovery message. As described above and will be further explained below, the identity of the candidate relay UE may be one of a layer-2 identity, a C-RNTI, and an I-RNTI.

It should be appreciated by persons skilled in the art that the sequence of the operations in exemplary procedure 1200 may be changed and some of the operations in exemplary procedure 1200 may be eliminated or modified, without departing from the spirit and scope of the disclosure.

Figure 13:
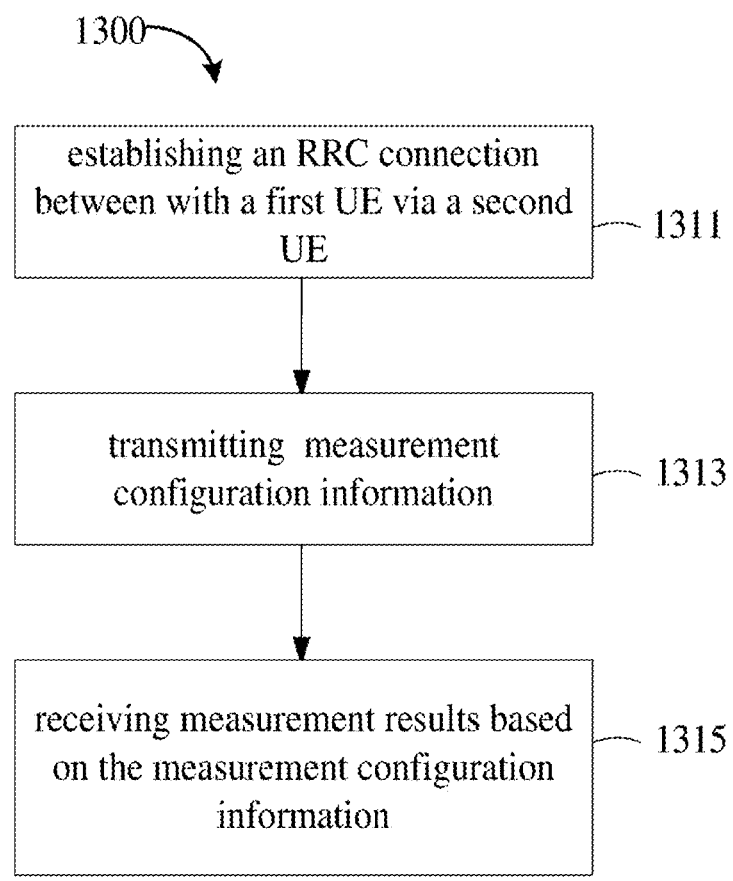
FIG. 13 illustrates an exemplary procedure for wireless communication in accordance with some embodiments of the present disclosure.

FIG. 13 illustrates an exemplary procedure 1300 for wireless communication in accordance with some embodiments of the present disclosure. Details described in all of the foregoing embodiments of the present disclosure are applicable for the embodiments shown in FIG. 13. In some examples, the procedure may be performed by a BS, for example, BS 1102 in FIG. 11.

Referring to FIG. 13, an RRC connection between a UE (hereinafter, "second UE") and a BS has been established. A PC5 RRC connection between the second UE and another UE (hereinafter, "first UE") has been established. In operation 1311, the BS may establish an RRC connection with the first UE via the second UE. In operation 1313, the BS may transmit measurement configuration information to the first UE. In some examples, the measurement configuration information may be included in a reconfiguration message. In operation 1315, the BS may receive measurement results based on the measurement configuration information.

In some embodiments of the present disclosure, the measurement configuration information may indicate a first set of candidate relay UEs connecting to the serving cell of the first UE (e.g., set A) and a second set of candidate relay UEs not connecting to the serving cell of the first UE (e.g., set B). In some embodiments of the present disclosure, the measurement configuration information may indicate a threshold for a PC5 link.

In some embodiments of the present disclosure, the measurement results may indicate an identity of a candidate relay UE from the first set of candidate relay UEs or the second set of candidate relay UEs. In some embodiments of the present disclosure, the identity of the candidate relay UE may be one of a layer-2 identity, a C-RNTI, and an I-RNTI.

In some embodiments of the present disclosure, the BS may maintain a mapping between a layer-2 identity and one of a C-RNTI and an I-RNTI of each candidate relay UE from the first set of candidate relay UEs and the second set of candidate relay UEs. In this way, the BS can differentiate the relay UEs.

It should be appreciated by persons skilled in the art that the sequence of the operations in exemplary procedure 1300 may be changed and some of the operations in exemplary procedure 1300 may be eliminated or modified, without departing from the spirit and scope of the disclosure.

Figure 14:
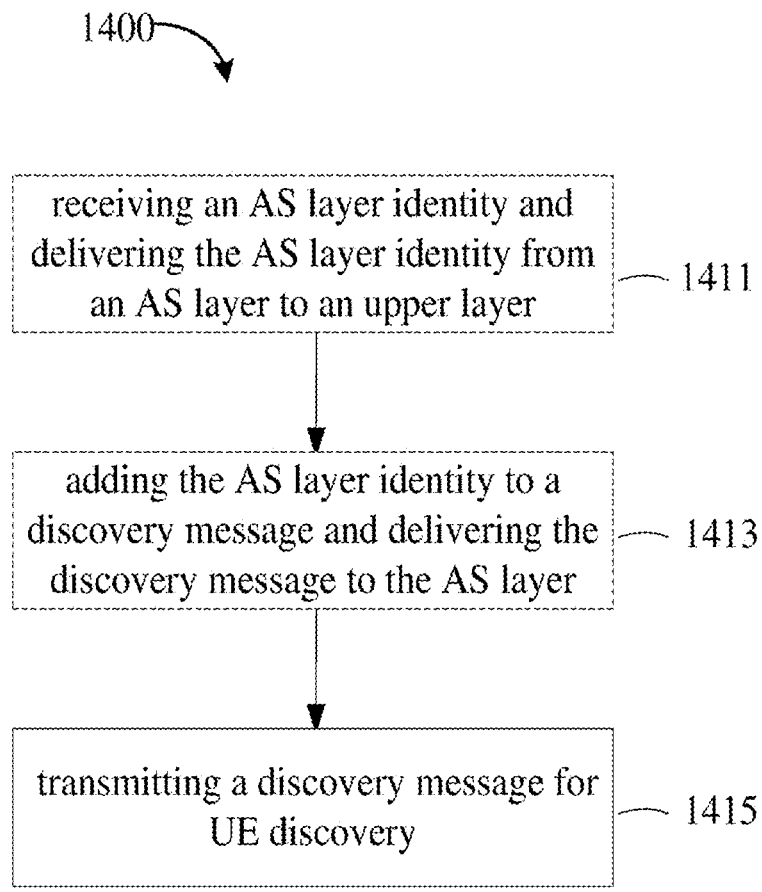
FIG. 14 illustrates an exemplary procedure for wireless communication in accordance with some embodiments of the present disclosure.

FIG. 14 illustrates an exemplary procedure 1400 for wireless communication in accordance with some embodiments of the present disclosure. Details described in all of the foregoing embodiments of the present disclosure are applicable for the embodiments shown in FIG. 14. In some examples, the procedure may be performed by a UE, for example, candidate relay UE #C as described above.

Referring to FIG. 14, in operation 1415, a UE may transmit a discovery message for UE discovery. In some examples, the discovery message may include a layer-2 identity of the UE. In some other examples, the discovery message may include an AS layer identity of the UE. The AS layer identity may be one of a C-RNTI and an I-RNTI.

In some embodiments of the present disclosure, to include the AS layer identity in the discovery message, procedure 1400 may include operations 1411 and 1413 (denoted by dotted block as an option). In operation 1411, the AS layer (e.g., MAC layer or RRC layer) of the UE may receive the AS layer identity from a BS, and may deliver the AS layer identity from the AS layer to an upper layer (e.g., PC5-S layer or application layer) of the UE. In operation 1413, the upper layer of the UE may add the AS layer identity to the discovery message, and may deliver the discovery message to the AS layer of the UE. The AS layer of the UE may transmit the discovery message. For example, the discovery message may finally reach the PHY layer for transmission.

It should be appreciated by persons skilled in the art that the sequence of the operations in exemplary procedure 1400 may be changed and some of the operations in exemplary procedure 1400 may be eliminated or modified, without departing from the spirit and scope of the disclosure.

Figure 15:
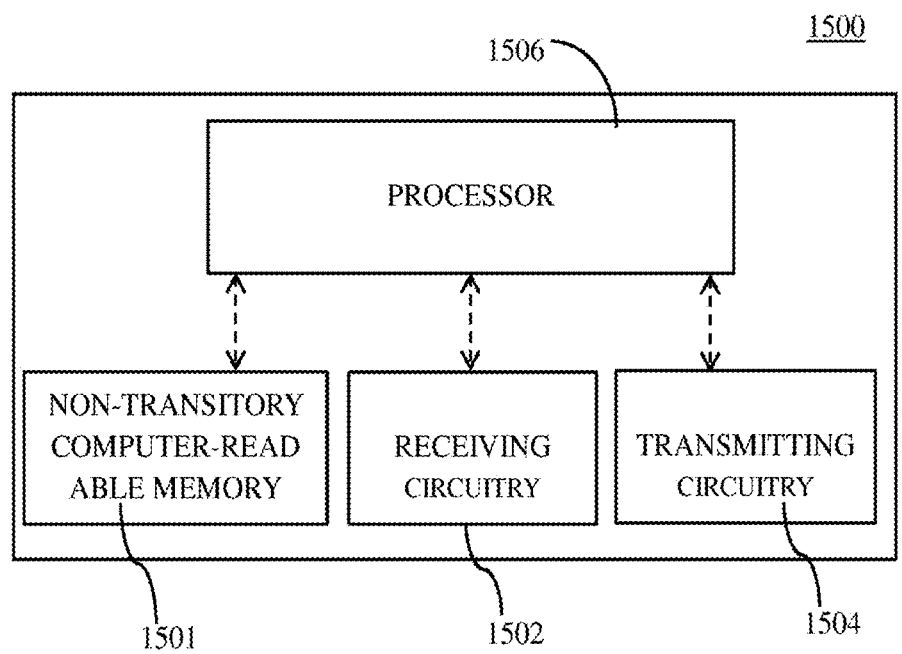
FIG. 15 illustrates a block diagram of an exemplary apparatus in accordance with some embodiments of the present disclosure.

FIG. 15 illustrates a block diagram of an exemplary apparatus 1500 according to some embodiments of the present disclosure.

As shown in FIG. 15, the apparatus 1500 may include at least one non-transitory computer-readable medium 1501, at least one receiving circuitry 1502, at least one transmitting circuitry 1504, and at least one processor 1506 coupled to the non-transitory computer-readable medium 1501, the receiving circuitry 1502 and the transmitting circuitry 1504. The apparatus 1500 may be a base station side apparatus (e.g., a BS) or a communication device (e.g., a UE).

Although in this figure, elements such as the at least one processor 1506, transmitting circuitry 1504, and receiving circuitry 1502 are described in the singular, the plural is contemplated unless a limitation to the singular is explicitly stated. In some embodiments of the present application, the receiving circuitry 1502 and the transmitting circuitry 1504 are combined into a single device, such as a transceiver. In certain embodiments of the present application, the apparatus 1500 may further include an input device, a memory, and/or other components.

In some embodiments of the present disclosure, the non-transitory computer-readable medium 1501 may have stored thereon computer-executable instructions to cause a processor to implement the method with respect to the UEs as described above. For example, the computer-executable instructions, when executed, cause the processor 1506 interacting with receiving circuitry 1502 and transmitting circuitry 1504, so as to perform the operations with respect to the UEs (either a remote UE, a serving relay UE, or a candidate relay UE) described in FIGS. 1-5, 7-12, and 14.

In some embodiments of the present disclosure, the non-transitory computer-readable medium 1501 may have stored thereon computer-executable instructions to cause a processor to implement the method with respect to the BSs as described above. For example, the computer-executable instructions, when executed, cause the processor 1506 interacting with receiving circuitry 1502 and transmitting circuitry 1504, so as to perform the operations with respect to the BSs described in FIGS. 1-5, 7, 8, 11, and 13.

Those having ordinary skill in the art would understand that the operations or steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the operations or steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in other embodiments. Also, all of the elements of each figure are not necessary for the operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The term "having" and the like, as used herein, are defined as "including." The wording "the first," "the second" or the like is only used to clearly illustrate the embodiments of the present application, but is not used to limit the substance of the present application.

What is claimed is:

1. A first user equipment (UE) for wireless communication, comprising:
at least one memory; and
at least one processor coupled to the at least one memory, the at least one processor configured to cause the first UE to:

establish a radio resource control (RRC) connection with a base station (BS) via a second UE, wherein a PC5 RRC connection between the first UE and the second UE has been established and an RRC connection between the second UE and the BS has been established;

receive, from the BS, measurement configuration information that indicates a first set of candidate relay UEs connecting to a serving cell of the first UE and a second set of candidate relay UEs not connecting to the serving cell of the first UE; and determine, based at least in part on the measurement configuration information, whether to perform at least one measurement.

2. The first UE of Claim 1, wherein the measurement configuration information indicates a threshold for a PC5 link.

3. The first UE of claim 2, wherein the at least one processor is configured to cause the first UE to:

perform, in response to a channel quality of a link between the first UE and the second UE being less than the threshold, the at least one measurement towards at least the first set of candidate relay UEs and the second set of candidate relay UEs.

4. The first UE of claim 3, wherein the at least one processor is configured to cause the first UE to:

report, in response to the channel quality of the link between the first UE and the second UE becoming an offset less than the channel quality of the link between the first UE and a candidate relay UE within a period, measurement results to the BS.

5. The first UE of claim 4, wherein the measurement results indicate an identity of the candidate relay UE received via a discovery message.

6. The first UE of claim 5, wherein the identity of the candidate relay UE is at least one of a layer-2 identity, a cell radio network temporary identifier (C-RNTI), or an inactive radio network temporary identifier (I-RNTI).

7. A method performed by a first user equipment (UE), the method comprising:

establishing a radio resource control (RRC) connection with a base station (BS) via a second UE, wherein a PC5 RRC connection between the first UE and the second UE has been established and an RRC connection between the second UE and the BS has been established;

receiving from the BS, measurement configuration information that indicates a first set of candidate relay UEs connecting to a serving cell of the first UE and a second set of candidate relay UEs not connecting to the serving cell of the first UE; and performing, based at least in part on the measurement configuration information, at least one measurement toward at least one candidate relay UE of the first set of candidate relay UEs or the second set of candidate relay UEs.

8. The method of Claim 7, wherein the measurement configuration information indicates a threshold for a PC5 link.

9. The method of claim 8, wherein the at least one measurement is performed in response to a channel quality of a link between the first UE and the second UE being less than the threshold for the PC5 link.

10. The method of claim 9, further comprising reporting, in response to the channel quality of the link between the first UE and the second UE becoming an offset less than the channel quality of the link between the first UE and a candidate relay UE within a period, measurement results to the BS.

11. The method of claim 10, wherein the measurement results indicate an identity of the candidate relay UE received via a discovery message.

12. The method of claim 11, wherein the identity of the candidate relay UE is at least one of a layer-2 identity, a cell radio network temporary identifier (C-RNTI), or an inactive radio network temporary identifier (I-RNTI).

13. A first user equipment (UE) for wireless communication, comprising:

at least one memory; and at least one processor coupled to the at least one memory, the at least one processor configured to cause the first UE to:

establish a radio resource control (RRC) connection with a base station (BS) via a second UE, wherein a PC5 RRC connection between the first UE and the second UE has been established and an RRC connection between the second UE and the BS has been established;

receive, from the BS, measurement configuration information that indicates a first set of candidate relay UEs connecting to a serving cell of the first UE and a second set of candidate relay UEs not connecting to the serving cell of the first UE; and perform, based at least in part on the measurement configuration information, at least one measurement toward at least one candidate relay UE of the first set of candidate relay UEs or the second set of candidate relay UEs.

14. The first UE of claim 1, wherein the measurement configuration information indicates a threshold for a PC5 link.

15. The first UE of claim 14, wherein the at least one measurement is performed based at least in part on a channel quality of a link between the first UE and the second UE being less than the threshold.

16. The first UE of Claim 1, wherein, in response to a channel quality of a link between the first UE and the second UE becoming an offset less than the channel quality of the link between the first UE and the at least one candidate relay UE within a period, the at least one processor is configured to cause the first UE to report a measurement result to the BS.

17. The first UE of claim 16, wherein the period is indicated in the measurement configuration information.

18. The first UE of claim 13, wherein the at least one processor is configured to generate a measurement result comprising an identity of the at least one candidate relay UE received via a discovery message.

19. The first UE of claim 18, wherein the identity of the at least one candidate relay UE comprises one or more of a layer-2 identity, a cell radio network temporary identifier (C-RNTI), or an inactive radio network temporary identifier (I-RNTI).

20. The first UE of claim 13, wherein the at least one processor is further configured to cause the first UE to perform an additional at least one measurement toward one or more of the serving cell or neighboring cells.

\* \* \* \* \*